US010357737B2

(12) United States Patent
Awadh et al.

(10) Patent No.: US 10,357,737 B2
(45) Date of Patent: Jul. 23, 2019

(54) SYSTEM FOR REMOVING SULFUR FROM FUELS USING CYLINDRICAL ADSORBENT CONTAINERS

(71) Applicant: KING FAHD UNIVERSITY OF PETROLEUM AND MINERALS, Dhahran (SA)

(72) Inventors: Tawfik Abdo Saleh Awadh, Dhahran (SA); Saddam Ahmed Al-Hammadi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/257,971

(22) Filed: Jan. 25, 2019

(65) Prior Publication Data

US 2019/0151791 A1 May 23, 2019

Related U.S. Application Data

(63) Continuation of application No. 15/485,776, filed on Apr. 12, 2017, now Pat. No. 10,245,547.

(51) Int. Cl.
| | |
|---|---|
| *B01J 8/26* | (2006.01) |
| *B01J 20/20* | (2006.01) |
| *C10G 25/09* | (2006.01) |
| *B01D 53/04* | (2006.01) |
| *B01D 53/12* | (2006.01) |
| *B01D 53/08* | (2006.01) |
| *B01J 20/02* | (2006.01) |
| *B01D 53/02* | (2006.01) |
| *C10G 25/00* | (2006.01) |

(52) U.S. Cl.
CPC ......... *B01D 53/0423* (2013.01); *B01D 53/02* (2013.01); *B01D 53/08* (2013.01); *B01D 53/12* (2013.01); *B01J 20/0225* (2013.01); *B01J 20/0237* (2013.01); *B01J 20/20* (2013.01); *C10G 25/003* (2013.01); *C10G 25/09* (2013.01); *B01D 2253/102* (2013.01); *B01D 2253/112* (2013.01); *B01D 2253/25* (2013.01); *B01D 2256/24* (2013.01); *B01D 2257/306* (2013.01); *B01D 2259/402* (2013.01); *B01D 2259/40083* (2013.01); *C10G 2300/202* (2013.01)

(58) Field of Classification Search
CPC .......... B01J 8/26; B01J 20/0237; B01J 20/20; C10G 25/09
See application file for complete search history.

(56) References Cited

U.S. PATENT DOCUMENTS

| 4,337,156 A | * | 6/1982 | deRosset ................ C10G 1/002 |
| | | | 208/310 Z |
| 6,503,962 B1 | | 1/2003 | Mouri et al. |
| 6,635,372 B2 | | 10/2003 | Gittleman |
| 2009/0118528 A1 | | 5/2009 | Yang et al. |

FOREIGN PATENT DOCUMENTS

| CN | 102188954 A | 9/2011 |
| CN | 105080487 A | 11/2015 |
| GB | 1 495 586 | 12/1977 |

OTHER PUBLICATIONS

C. O. Ania and T. J. Bandosz, Metal-Loaded Polystyrene-Based Activated Carbon as Dibenzothiophene Removal Media via Reactive Adsorption, 44 Carbon 2404-2412 (2006).*
Tian Huang, et al., "Desulfurization Activity of Cobalt-Blended into Activated Carbon by One-step Activation Method," Asian Journal of Chemistry, vol. 26, No. 4, Feb. 2014, pp. 1056-1062 (Abstract only).
Arturo J. Hernández-Maldonado, et al., "New Sorbents for Desulfurization of Diesel Fuels via π-Complexation," American Institute of Chemical Engineers, vol. 50. No. 4, Apr. 2004, pp. 791-801.
Tawfik A. Saleh, et al., "Influence of acidic and basic treatments of activated carbon derived from waste rubber tires on adsorptive desulfurization of thiophenes," Journal of the Taiwan Institute of Chemical Engineers, 2015; pp. 1-9.
Gaddafi I. Danmaliki, et al., "Influence of conversion parameters of waste tires to activated carbon on adsorption of dibenzothiophene from model fuels," Journal of Cleaner Production, 2016, pp. 1-6.
C. O. Ania and T. J. Bandosz, "Metal-Loaded Polystyrene-Based Activated Carbon as Dibenzothiophene Removal Media via Reactive Adsorption", vol. 44, Carbon, pp. 2404-2412 (2006).

* cited by examiner

*Primary Examiner* — Randy Boyer
(74) *Attorney, Agent, or Firm* — Oblon, McClelland, Maier & Neustadt, L.L.P.

(57) ABSTRACT

A sulfur removal system including a first reactor and a second reactor that are located in series to one another each having an adsorbent that includes cobalt and copper on an activated carbon support, a method of desulfurizing a sulfur-containing hydrocarbon stream via the sulfur removal system, and a method of making the adsorbent. Various embodiments of the sulfur removal system, the desulfurizing method, and the method of making the adsorbent is also provided.

7 Claims, 8 Drawing Sheets

SYSTEM FOR REMOVING SULFUR FROM FUELS USING CYLINDRICAL ADSORBENT CONTAINERS

CROSS-REFERENCE TO RELATED APPLICATIONS

The present application is a Continuation of Ser. No. 15/485,776, now allowed, having a filing date of Apr. 12, 2017.

STATEMENT OF FUNDING ACKNOWLEDGEMENT

The support provided by King Abdulaziz City for Science and Technology (KACST) through the Science & Technology Unit at King Fand University of Petroleum & Minerals (KFUPM) for funding through a project no. 13-PET393-04 as part of the National Science, Technology and Innovation Plan is acknowledged.

BACKGROUND OF THE INVENTION

Technical Field

The present invention relates to a sulfur removal system with a first and a second reactor and an adsorbent that includes cobalt and copper on an activated carbon support.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hydro-desulfurization is a common method of desulfurization that is wieldy used in refineries. This method, however, requires a high temperature, a high pressure, and a large catalyst volume [C. Song, Fuel processing for low-temperature and high-temperature fuel cells: challenges, and opportunities for sustainable development in the 21st century, Catal. Today 77 (2002) 17-49; D. D. Whitehurst, T. Isoda, and I. Mochida, Present State of the Art and Future Challenges in the Hydrodesulfurization of Polyaromatic Sulfur Compounds, Elsevier Masson SAS 42 (1998) 345-471; R. Shafi and G. J. Hutchings, Hydrodesulfurization of hindered dibenzothiophenes: an overview, Catal., Today 59 (2000), 423-422]. Therefore, adsorptive desulfurization has been considered as an alternative desulfurization technique that provides relatively mild operating conditions and higher selectivity for thiophenic compounds compared to hydrodesulfurization techniques. In addition, adsorptive desulfurization can provide nearly 100% sulfur removal when a suitable adsorbent is used [I. Ahmed, S. H. Jhung, Composites of metal-organic frameworks: Preparation and application in adsorption, Mater. Today 17 (2014) 136-146; J. M. Palomino, D. T. Tran, A. R. Kareh, C. A. Miller, J. M. V Gardner, H. Dong, S. J. Oliver, Zirconia-silica based mesoporous desulfurization adsorbents, J. Power Sources. 278 (2015) 141-148].

Selecting a suitable adsorbent is important for an efficient adsorptive desulfurization process. It has been shown that metal oxides are among good sulfur adsorbents that are functional at high temperatures. Various metal oxides have been reported as efficient sulfur adsorbents due to their high affinity to sulfur. Exemplary metal oxides include Zn, Mn, Cu, Co, Ni, Cr, Ca, and Fe [H. F. Garces, H. M. Galindo, L. J. Garces, J. Hunt, A. Morey, S. L. Suib, Low temperature $H_2S$ dry-desulfurization with zinc oxide, Microporous Mesoporous Mater. 127 (2010) 190-197; J. Bin Chung, J. S. Chung, Desulfurization of $H_2S$ using cobalt-containing sorbents at low temperatures, Chem. Eng. Sci. 60 (2005) 1515-1523; H. F. Garces, A. E. Espinal, S. L. Suib, Tunable shape microwave synthesis of zinc oxide nanospheres and their desulfurization performance compared with nanorods and platelet-like morphologies for the removal of hydrogen sulfide, J. Phys. Chem. C. 116 (2012) 8465-8474; M. Flytzani-Stephanopoulos, M. Sakbodin, Z. Wang, Regenerative Adsorption and Removal of $H_2S$ from Hot Fuel Gas Streams by Rare Earth Oxides, Science, 312 (2006) 1508-1510; E. Richter, Chemical Reactions as a Means of Separation: Sulfur Removal, Chemie Ing. Tech. 50 (1978) 698-698; T. A. Saleh, G. I. Danmaliki, Adsorptive desulfurization of dibenzothiophene from fuels by rubber tires-derived carbons: Kinetics and isotherms evaluation, Process Safety and Environmental Protection 102 (2016) 9-19; G. I. Danmaliki, T. A. Saleh, Influence of conversion parameters of waste tires to activated carbon on adsorption of dibenzothiophene from model fuels, Journal of Cleaner Production, 117 (2016) 50-55; T. A. Saleh, G. I. Danmaliki, Influence of acidic and basic treatments of activated carbon derived from waste rubber tires on adsorptive desulfurization of thiophenes, Journal of the Taiwan Institute of Chemical Engineers, 60 (2016) 460-468; T. A. Saleh, The influence of treatment temperature on the acidity of MWCNT oxidized by $HNO_3$ or a mixture of $HNO_3/H_2SO_4$, Applied Surface Science, 257 (2011) 7746-7751]. On the other hand, various methods have been developed to enhance the performance of an adsorptive desulfurization process. Accordingly, researchers have investigated the performance of an adsorptive desulfurization process by doping metals or metal oxides onto sulfur adsorbents. For example, Ca—Ba, Zinc ferrite ($ZnxFe_3-xO_4$), Cu—Cr—O and Cu—Ce—O adsorbents have been successfully utilized in an adsorptive desulfurization process at high temperature [M. Stemmler, A. Tamburro, M. Muller, Laboratory investigations on chemical hot gas cleaning of inorganic trace elements for the 'UNIQUE' process, Fuel, 108 (2013) 31-36; R. E. Anala, D. W. Marsh, Characterization and Long-Range Reactivity of Zinc Ferrite in High-Temperature Desulfurization Processed, Ind. Eng. Chem. Res. 30, (1991) 55-60; Z. Li, M. Flytzani-stephanopoulos, Cu—Cr—O and Cu—Ce—O Regenerable Oxide Sorbents for Hot Gas Desulfurization, 36 (1997) 187-196]. In a separate study, these metals or metal oxides have been placed on a surface of one or more adsorptive supports e.g. silica, alumina, zeolite, or activated carbon in order to boost the number of active adsorptive sites of the adsorbents. Among these adsorptive supports, activated carbon revealed good surface characteristics with large pore volumes [K. S. Triantafyllidis, E. A. Deliyanni, Desulfurization of diesel fuels: Adsorption of 4,6-DMDBT on different origin and surface chemistry nanoporous activated carbons, Chem. Eng. J. 236 (2014) 406-414]. In addition, an activated carbon support can be treated in an acidic or a basic solution to generate a surface modified support that has active adsorptive sites [C. Y. Yin, M. K. Aroua, W. M. Daud, Review of modifications of activated carbon for enhancing contaminant uptakes from aqueous solutions, Sep. Purif. Technol. 52 (2007) 403-415]. In a recent study, an activated carbon support has been impregnated with Pd, Al, and Fe. The resulting adsorbent revealed promising results in an adsorptive desulfurization process [A. Lopes, A. Scheer, G. Silva, C. Yamamoto, Pd-Impregnated activated carbon and treatment acid to remove sulfur and nitrogen from diesel, Materia (Rio Janeiro) 21 2016 407-415; S. A. Ganiyu, K. Alhooshani, K. O. Sulaiman, M. Qamaruddin, I. A. Bakare, A. Tanimu, T. A.

Saleh, Influence of aluminium impregnation on activated carbon for enhanced desulfurization of DBT at ambient temperature: Role of surface acidity and textural properties, Chem. Eng. J. 303 (2016) 489-500; J. X. Guo, S. Shu, X. L. Liu, X. J. Wang, H. Q. Yin, Y. H. Chu, Influence of Fe loadings on desulfurization performance of activated carbon treated by nitric acid, Environ. Technol. 3330 (2016) 1-11].

In view of the forgoing, one objective of the present invention is to provide a sulfur removal system that utilizes an adsorbent to effectively remove sulfur compounds via an adsorptive desulfurization process at room temperature and atmospheric pressure. The adsorbent includes cobalt and copper on an activated carbon support.

BRIEF SUMMARY OF THE INVENTION

According to a first aspect, the present disclosure relates to a sulfur removal system including i) a first reactor including a) a first vessel having a first internal cavity with a first adsorbent bed that contains a first adsorbent, b) a first inlet located proximal to a bottom of the first vessel, c) a first outlet located proximal to a top of the first vessel, ii) a second reactor including a second vessel having a second inlet, a second outlet, and a second internal cavity with a second adsorbent bed that contains a second adsorbent, wherein the first and the second adsorbents comprise cobalt and copper on an activated carbon support, wherein the first adsorbent bed has a cross-sectional area that is substantially the same as a cross-sectional area of the first vessel, and wherein the second inlet is fluidly connected to the first outlet via a connecting line.

In one embodiment, the first and the second adsorbents are substantially the same.

In one embodiment, the system further includes a lower mesh structure located in the first internal cavity and proximal to the bottom of the first vessel and an upper mesh structure located in the first internal cavity and proximal to the top of the first vessel, defining the first adsorbent bed.

In one embodiment, the first adsorbent has a particle size in the range of 0.5 to 10 mm, and wherein the lower and the upper mesh structures have a mesh size of less than 0.5 mm.

In one embodiment, the first reactor is a fluidized-bed reactor.

In one embodiment, the second reactor is a fixed-bed reactor.

In one embodiment, the second inlet is located proximal to a top of the second vessel and the second outlet is located proximal to a bottom of the second vessel.

In one embodiment, the second inlet is located proximal to a bottom of the second vessel and the second outlet is located proximal to a top of the second vessel.

In one embodiment, the system further includes a liquid reservoir located upstream of and fluidly connected to the first inlet via a solvent line, wherein the liquid reservoir is configured to deliver a solvent to the first and the second internal cavities to regenerate the first and the second adsorbents.

According to a second aspect, the present disclosure relates to a method of desulfurizing a sulfur-containing hydrocarbon stream with the sulfur removal system, involving i) delivering the sulfur-containing hydrocarbon stream to the first inlet and contacting the sulfur-containing hydrocarbon stream with the first adsorbent to form a partially desulfurized hydrocarbon stream, ii) delivering the partially desulfurized hydrocarbon stream to the second inlet and contacting the partially desulfurized hydrocarbon stream with the second adsorbent to form a desulfurized hydrocarbon stream.

In one embodiment, the sulfur-containing hydrocarbon stream is contacted with the first adsorbent at a temperature of 15 to 35° C. and a pressure of 0.9 to 1.1 atm.

In one embodiment, the partially desulfurized hydrocarbon stream is contacted with the second adsorbent at a temperature of 15 to 35° C. and a pressure of 0.9 to 1.1 atm.

In one embodiment, the sulfur-containing hydrocarbon stream comprises at least one sulfur compound selected from the group consisting of a thiophene, a benzothiophene, a dibenzothiophene, a methyl benzothiophene, a methyl dibenzothiophene, and a dimethyl dibenzothiophene.

In one embodiment, a concentration of sulfur compounds in the sulfur-containing hydrocarbon stream is at least 50 ppm, and wherein a concentration of sulfur compounds in the desulfurized hydrocarbon stream is no more than 5 ppm.

In one embodiment, the sulfur removal system further includes a liquid reservoir located upstream of and fluidly connected to the first inlet via a solvent line, and the method further involves delivering a solvent to the first inlet to regenerate the first adsorbent and the second inlet to regenerate the second adsorbent.

In one embodiment, the first adsorbent is regenerated within the first reactor and the second adsorbent is regenerated within the second reactor.

In one embodiment, the method further involves delivering an inert gas to the first inlet to evaporate the solvent, after delivering the solvent.

In one embodiment, the inert gas is nitrogen gas with a temperature in the range of 150 to 350° C., which is delivered with a flow rate of 0.02 to 5 L/min.

According to a third aspect, the present disclosure relates to a method of making an adsorbent, which comprises cobalt and copper on an activated carbon support. The method involves i) mixing activated carbon particles with an aqueous solution comprising at least one of ethanol, diethylene glycol, and sodium diacetate to form a first suspension, ii) mixing a cobalt-containing solution with the first suspension and refluxing to form cobalt-containing activated carbon particles, iii) filtering and drying the cobalt-containing activated carbon particles and mixing the same with the aqueous solution to form a second suspension, iv) mixing and refluxing a copper-containing solution with the second suspension to form the adsorbent.

In one embodiment, the method further involves i) isothermally heating a rubber at a temperature of 250 to 550° C. to form a char, ii) treating the char with an oxidizing agent to remove organic impurities, iii) isothermally heating the char at a temperature of 400 to 900° C., iv) treating the char with an acid solution to form the activated carbon particles, prior to mixing the activated carbon particles with the aqueous solution.

In one embodiment, the cobalt-containing solution is cobalt acetate dissolved in deionized water.

In one embodiment, the copper-containing solution is copper nitrate dissolved in deionized water.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figures 1A, 1B:
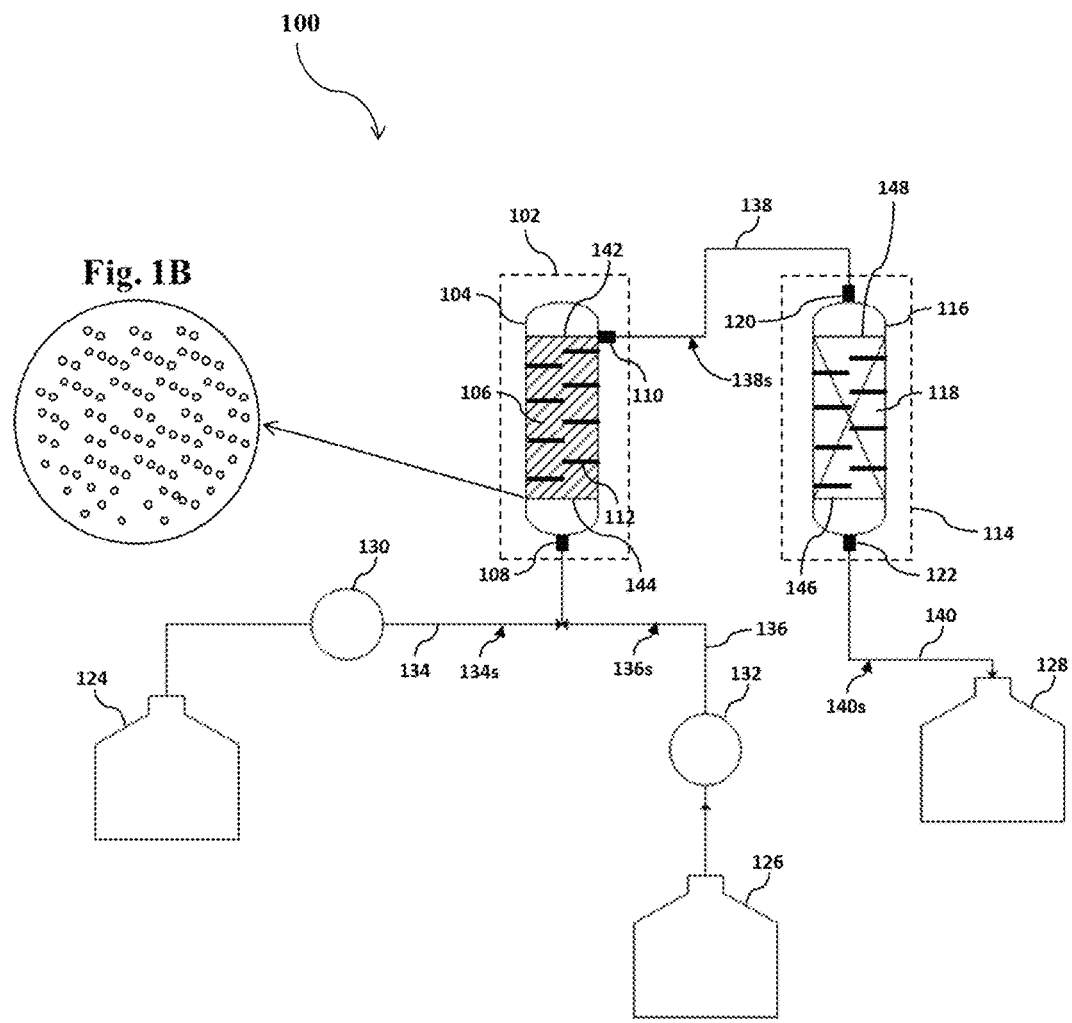
FIG. 1A is a schematic of a sulfur removal system with a first and a second reactor located in series to one another.
FIG. 1B is a top-view of a lower or an upper mesh structure of the first or the second reactor.

Referring now to the drawings, wherein like reference numerals designate identical or corresponding parts throughout the several views.

Referring to FIG. 1A, according to a first aspect, the present disclosure relates to a sulfur removal system 100 that includes a first reactor 102 having a first vessel 104. The first vessel has a first adsorbent bed 106 that contains a first adsorbent.

In a preferred embodiment, the first reactor 102 includes a cylindrical vessel that is vertically oriented, wherein a sulfur-containing hydrocarbon stream, which is preferably in a liquid state, enters said first reactor from a bottom end. In another preferred embodiment, the first reactor 102 is a fluidized-bed reactor, wherein the sulfur-containing hydrocarbon stream is passed through the first adsorbent present in the first adsorbent bed at high velocity to suspend the first adsorbent, whereby at least a portion of sulfur compounds present in the sulfur-containing hydrocarbon stream are absorbed by the first adsorbent.

The term "first vessel" as used herein refers to a compartment having a first internal cavity that is configured to contain a solid, a liquid, and/or a gas at various temperatures and pressures. In a preferred embodiment, the first vessel 104 is made of a material that can withstand a corrosive environment provided by sulfur compounds present in the sulfur-containing hydrocarbon stream. For example, in one embodiment, the first vessel is made of quartz or a plastic composite (e.g. epoxy composite, vinyl ester, etc.). In an alternative embodiment, the first vessel is made of a metal or a metal alloy such as stainless steel, nickel steel, chromium steel, aluminum, aluminum alloy, copper and copper alloys, titanium, and the like. Accordingly, an inner surface of the first vessel is coated with a polymeric liner (e.g. an epoxy liner), quartz, or Pyrex® to prevent corrosion. Alternatively, the inner surface of the first vessel may be coated with a ceramic material such as silica, alumina, or borides, carbides, nitrides, and/or oxides of transition metals selected from the group consisting of Al, Si, Sc, Ti, V, Cr, Zr, Nb, Mo, Hf, Ta, and Th, for example, hafnium diboride ($HfB_2$), zirconium diboride (ZrB), hafnium nitride (HfN), zirconium nitride (ZrN), titanium carbide (TiC), titanium nitride (TiN), thorium dioxide ($ThO_2$), tantalum carbide (TaC), and composites thereof. Although the materials used to construct the first vessel are not meant to be limiting and various other materials may also be used.

In a preferred embodiment, the first vessel 104 is vertically oriented with a cylindrical geometry with a first and a second end separated by a side wall along a longitudinal axis, and a height in the range of 0.2 to 10 m, preferably 0.5 to 9 m, preferably 1 to 8 m, preferably 3 to 7 m, preferably 4 to 6 m, and a diameter in the range of 1 to 200 cm, preferably 10 to 180 cm, preferably 20 to 150 cm, preferably 30 to 140 cm, preferably 40 to 130 cm, preferably 50 to 120 cm, preferably 60 to 110 cm, preferably 70 to 105 cm, preferably 80 to 100 cm. The first vessel 104 may have a volume in the range of 0.1-100,000 L, preferably 1-50,000 L, preferably 10-40,000 L, preferably 100-30,000 L, preferably 500-20,000 L, preferably 1,000-10,000 L, preferably 2,000-5,000 L. The first vessel may also have other geometries such as rectilinear or rectangular, which may preferably be vertically oriented.

The first adsorbent bed 106 is located inside the first internal cavity, and the first adsorbent bed contains the first adsorbent. A cross-sectional area of the first adsorbent bed 106 is substantially the same as a cross-sectional area of the first vessel 104. Accordingly, in one embodiment, the first vessel 104 is a vertically oriented cylindrical vessel having a circular cross-section with a diameter in the range of 1 to 200 cm, preferably 10 to 180 cm, preferably 20 to 150 cm, preferably 30 to 140 cm, preferably 40 to 130 cm, preferably 50 to 120 cm, preferably 60 to 110 cm, preferably 70 to 105 cm, preferably 80 to 100 cm, wherein the first adsorbent bed 106 also has a circular cross-section with a diameter in the range of 1 to 200 cm, preferably 10 to 180 cm, preferably 20 to 150 cm, preferably 30 to 140 cm, preferably 40 to 130 cm, preferably 50 to 120 cm, preferably 60 to 110 cm, preferably 70 to 105 cm, preferably 80 to 100 cm. In view of this embodiment, the first adsorbent, which is present in the first adsorbent bed 106, cannot move along the longitudinal axis of the first vessel. Accordingly, the first vessel is made of a singular construction and there is no inner wall within the first vessel, e.g. a wall that is substantially parallel to the longitudinal axis of the first vessel and is configured to segregate a portion of the first adsorbent from the rest. Therefore, the first adsorbent is present in the first adsorbent bed and moves within the first adsorbent bed. With that being said, the first adsorbent may preferably not be found anywhere else in the first vessel, except in the first adsorbent bed. For example, the first vessel does not include a separating zone and/or a settling zone as in the patent reference GB 1,495,586. In another embodiment, the sulfur-containing hydrocarbon stream is evenly distributed to the bottom of the first adsorbent bed so that the sulfur-containing hydrocarbon stream is evenly contacted with the first adsorbent present in the first adsorbent bed. For example, in one embodiment, the sulfur-containing hydrocarbon stream is evenly distributed when a distributer (e.g. a shower head flow distributor) is disposed in the first inlet and inside the vessel. Accordingly, the sulfur-containing hydrocarbon stream is preferably evenly contacted with the first adsorbent present in the first adsorbent bed.

The term "substantially the same" as used in this disclosure refers to embodiments wherein a quantity differs by no more than 1%, preferably by no more than 0.5%. For example, the phrase "a cross-sectional area of the first adsorbent bed is substantially the same as a cross-sectional area of the first vessel", means that the cross-sectional area of the first adsorbent bed differs by no more than 1%, preferably by no more than 0.5% of the cross-sectional area of the first vessel.

In one embodiment, a height of the first adsorbent bed 106 is 20% to 95%, preferably 30% to 90%, preferably 40% to 85%, preferably 50% to 80% relative to the height of the first vessel, which is in the range of 0.2 to 10 m, preferably 0.5 to 9 m, preferably 1 to 8 m, preferably 3 to 7 m, preferably 4 to 6 m. In some embodiments, the height of the first adsorbent bed is less than 50%, for example in the range of 20% to 50%, preferably 25% to 45%, preferably 30% to 40% relative to the height of the first vessel, and a plurality of first adsorbent beds (e.g. two, three, four, but no more than ten) are arranged in the first vessel. In the above embodiments, the first adsorbent bed is fixed inside the first vessel (i.e. the first adsorbent bed does not move along the longitudinal axis of the first vessel).

In one embodiment, the first reactor 102 further includes a lower mesh structure 144 located in the first internal cavity and proximal to the bottom of the first vessel 104 and an upper mesh structure 142 located in the first internal cavity and proximal to the top of the first vessel 104, defining the first adsorbent bed 106. Accordingly, the height of the first adsorbent bed is defined as a distance between the lower and the upper mesh structures. Preferably, each of the lower and the upper mesh structures has a planar axis and the lower and the upper mesh structures secured inside the first vessel 104 such that the planar axis of each is substantially perpendicular to the longitudinal axis of the first vessel 104. In some embodiments, the lower and the upper mesh structures are tilted such that an angle between the planar axis of each of the lower and the upper mesh structures and the longitudinal axis of the first vessel is in the range of 80 to 100°, preferably 82 to 98°, preferably 84 to 96°, preferably 86 to 94°, preferably 88 to 92°. In a preferred embodiment, the lower and the upper mesh structures have the same diameter as that of the first vessel, when the planar axis of each of the mesh structures is perpendicular with the longitudinal axis of the first vessel (as shown in FIG. 1A). In another embodiment, the planar axis of each of the lower and the upper mesh structures form an angle in the range of 80 to 100°, preferably 82 to 98°, preferably 84 to 96°, preferably 86 to 94°, preferably 88 to 92° with the longitudinal axis of the first vessel, wherein, each mesh structure has a larger diameter than a diameter of the first vessel.

Each of the lower and the upper mesh structures are configured to secure the first adsorbent in place within the first internal cavity, thereby allowing the sulfur-containing hydrocarbon stream to pass through the first adsorbent bed. In view of that, in one embodiment, the first adsorbent has a particle size in the range of 0.5 to 10 mm, preferably 1 to 8 mm, preferably 1.2 to 6 mm, preferably 1.4 to 5 mm, preferably 1.5 to 4 mm, and the lower and the upper mesh structures have a mesh size of less than 0.5 mm. In a preferred embodiment, a mesh size of the lower and the upper mesh structures is at least 5%, preferably at least 10% smaller than a size of the smallest adsorbent particle found in the first adsorbent. For example, if the smallest adsorbent particle found in the first adsorbent is 1 mm, the mesh size in the lower and the upper mesh structures is preferably 0.95 mm, more preferably 0.9 mm. The term "mesh size" as used herein refers to the size of the holes (i.e. meshes) present in the mesh structures measured via ASTM E11:01. A top view cross-section of each of the lower and the upper mesh structure is depicted in FIG. 1B. Since the mesh size of the mesh structures is smaller than the particle size of the first adsorbent, the first adsorbent is secured in the first adsorbent bed.

The first reactor 102 further includes a first inlet 108 located proximal to the bottom of the first vessel 104 and a first outlet 110 located proximal to the top of the first vessel 104. The first inlet and the first outlet are configured as passages for loading and unloading the first vessel. The first inlet 108 is preferably secured parallel to the longitudinal axis of the first vessel, whereas the first outlet 110 may preferably be secured perpendicular (as shown in FIG. 1A) or parallel to the longitudinal axis of the first vessel (as shown in FIG. 1F). In another embodiment, an angle between a longitudinal axis of the first outlet and that of the first vessel is in the range of 5 to 85°, preferably 15 to 75°, preferably 25 to 65°, preferably 35 to 55°, preferably about 45°.

The phrase "proximal to the bottom of the first vessel" as used herein refers to a region of the first vessel that is located less than 20%, preferably less than 15%, preferably less than 10%, preferably less than 5% of the height of the first vessel, when measured from the bottom of the first vessel, with 0% being the bottom and 100% being the top of the first vessel. Accordingly, the phrase "proximal to the top of the first vessel" as used herein refers to a region of the first vessel that is located less than 20%, preferably less than 15%, preferably less than 10%, preferably less than 5% of the height of the first vessel, when measured from the top of the first vessel, with 0% being the top and 100% being the bottom of the first vessel.

In one embodiment, the first inlet 108 and the first outlet 110 are substantially the same, wherein each is a cylindrical port having an internal diameter in the range of 1-100 mm, preferably 5-80 mm, preferably 10-70 mm, preferably 15-60 mm, more preferably 20-50 mm. Preferably, the first inlet 108 and the first outlet 110 are made of a material that can withstand a corrosive environment provided by sulfur compounds present in the sulfur-containing hydrocarbon stream that is delivered to the first vessel. For example, in one embodiment, the first inlet and the first outlet are made of quartz or a plastic composite (e.g. epoxy composite, vinyl ester, etc.). In an alternative embodiment, the first inlet and the first outlet are made of a metal or a metal alloy such as stainless steel, nickel steel, chromium steel, aluminum, aluminum alloy, copper and copper alloys, titanium, and the like. Accordingly, an inner surface of the first inlet and the first outlet are coated with a polymeric liner (e.g. an epoxy liner), quartz, or Pyrex® to prevent corrosion. Other than the first inlet and the first outlet designed to allow ingress and egress, the first vessel may be sealed to prevent any leakage.

The sulfur removal system 100 further includes a second reactor 114 with a second vessel 116. The second vessel has a second adsorbent bed 118 that contains a second adsorbent. Preferably, the second reactor 114 is a cylindrical vessel that is vertically or horizontally oriented, wherein a partially desulfurized hydrocarbon stream, which is preferably in a liquid state, enters the reactor from a bottom or a top end (when the reactor is vertically oriented) or from a left or a right end (when the reactor is horizontally oriented). In a preferred embodiment, the second reactor 114 is a fixed-bed reactor, wherein the partially desulfurized hydrocarbon stream is passed through the second adsorbent present in the second adsorbent bed 118, to adsorb at least a portion of sulfur compounds present in the partially desulfurized hydrocarbon stream.

The second vessel 116 refers to a compartment having a second internal cavity, configured to contain a solid, a liquid, and/or a gas at various temperatures and pressures. In a preferred embodiment, specification of the second vessel 116 such as sizing and the type of materials used for manufacturing the second vessel are substantially the same as that of the first vessel 104. Although in some embodiments, a sizing and/or the type of materials of the second vessel is different than that of the first vessel.

In one embodiment, a cross-sectional area of the second adsorbent bed 118 is substantially the same as a cross-sectional area of the second vessel 116. Accordingly, in one embodiment, the second vessel 116 is a vertically oriented cylindrical vessel having a circular cross-section with a diameter in the range of 1 to 200 cm, preferably 10 to 180 cm, preferably 20 to 150 cm, preferably 30 to 140 cm, preferably 40 to 130 cm, preferably 50 to 120 cm, preferably 60 to 110 cm, preferably 70 to 105 cm, preferably 80 to 100 cm, wherein the second adsorbent bed also has a circular cross-section with a diameter in the range of 1 to 200 cm, preferably 10 to 180 cm, preferably 20 to 150 cm, preferably 30 to 140 cm, preferably 40 to 130 cm, preferably 50 to 120 cm, preferably 60 to 110 cm, preferably 70 to 105 cm, preferably 80 to 100 cm. In another embodiment, the second adsorbent bed has other geometries including, but not limited to a hollow tube, a pipe, a duct, etc. In a preferred embodiment, the second adsorbent is stationary in the second adsorbent bed 118, and only a fluid, preferably in liquid state, is passed through the second adsorbent bed.

In one embodiment, a height (or length in case the second vessel is horizontally oriented) of the second adsorbent bed is 20% to 95%, preferably 30% to 90%, preferably 40% to 85%, preferably 50% to 80% relative to the height/length of the second vessel, which is in the range of 0.2 to 10 m, preferably 0.5 to 9 m, preferably 1 to 8 m, preferably 3 to 7 m, preferably 4 to 6 m. In one embodiment, the second adsorbent bed 118 is fixed inside the second vessel 116 (i.e. the second adsorbent bed does not move along the longitudinal axis of the second vessel), although the second adsorbent bed may also move along the longitudinal axis of the second vessel. In some embodiments, the height/length of the second adsorbent bed is less than 50%, for example in the range of 20% to 50%, preferably 25% to 45%, preferably 30% to 40% relative to the height/length of the second vessel, and a plurality of second adsorbent beds (e.g. two, three, four, but no more than ten) are arranged in the second vessel.

In one embodiment, at least 50%, preferably at least 60%, preferably at least 70%, preferably at least 80%, preferably at least 85%, but no more than 90% of the total volume of the first adsorbent bed 106 is filled with the first adsorbent. In another embodiment, 100% of the total volume of the second adsorbent bed 118 is filled with the second adsorbent, wherein the volume of the second adsorbent bed is at least 50%, preferably at least 60%, preferably at least 70%, preferably at least 80%, preferably at least 85%, but no more than 90% of the total volume of the second vessel 116.

In one embodiment, the second reactor 114 further includes a second lower mesh structure 146 located in the second internal cavity and proximal to the bottom of the second vessel 116 and a second upper mesh structure 148 located in the second internal cavity and proximal to the top of the second vessel 116, defining the second adsorbent bed 118. Accordingly, the height of the second adsorbent bed is defined as a distance between the lower and the upper mesh structures. Preferably, the second lower and the second upper mesh structures are substantially the same as that of the lower and the upper mesh structures, as depicted in FIG. 1B.

The second reactor 114 further includes a second inlet 120 and a second outlet 122. The second inlet and the second outlet are configured as passages for loading and unloading the second vessel. The second inlet 120 and the second outlet 122 are preferably secured parallel (as shown in FIG. 1A) or perpendicular to the longitudinal axis of the second vessel 116. In another preferred embodiment, the second inlet is secured parallel to the longitudinal axis of the second vessel, and the second outlet is secured such that an angle between a longitudinal axis of the second outlet and that of the second vessel is in the range of 5 to 85°, preferably 15 to 75°, preferably 25 to 65°, preferably 35 to 55°, preferably about 45°.

In a preferred embodiment, the second vessel 116 is vertically oriented, wherein the second inlet 120 is located proximal to the top of the second vessel and the second outlet 122 is located proximal to the bottom of the second vessel. In view of this embodiment, a liquid stream (i.e. the partially desulfurized hydrocarbon stream) has a downward flow direction inside the second vessel. In an alternative embodiment, the second vessel is vertically oriented, wherein the second inlet is located proximal to the bottom of the second vessel and the second outlet is located proximal to the top of the second vessel. In view of this embodiment, a liquid stream (i.e. the partially desulfurized hydrocarbon stream) has an upward flow direction inside the second vessel.

In one embodiment, the second inlet 120 and the second outlet 122 are substantially the same, wherein each is a cylindrical port having an internal diameter in the range of 1-100 mm, preferably 5-80 mm, preferably 10-70 mm, preferably 15-60 mm, more preferably 20-50 mm. In a preferred embodiment, specification of the second inlet 120 and the second outlet 122 such as sizing and the type of materials used for manufacturing are substantially the same to that of the first inlet 108 and the first outlet 110. Although in another embodiment, the sizing and/or the type of materials of the second inlet and the second outlet is different than that of the first inlet and the first outlet. Other than the second inlet and the second outlet designed to allow ingress and egress, the second vessel may be sealed to prevent any leakage.

The second inlet 120 is fluidly connected to the first outlet 110 via a connecting line 138. The connecting line 138 refers to a tubular channel configured to fluidly connect the first outlet 110 to the second inlet 120. Preferably, the connecting line 138 is made of a metal or a metal alloy with an anti-corrosive plastic liner or a ceramic liner (e.g. alumina). In one embodiment, a diameter of the connecting line is in the range of 1-100 mm, preferably 5-80 mm, preferably 10-70 mm, preferably 15-60 mm, more preferably 20-50 mm, relative to the diameter of the first outlet and the second inlet, which is in the range of 1-100 mm, preferably 5-80 mm, preferably 10-70 mm, preferably 15-60 mm, more preferably 20-50 mm.

Each of the first and the second vessels further includes a plurality of baffles 112 secured to the inner wall of the first and the second vessels (as depicted in FIG. 1A). In a preferred embodiment, the baffles 112 are equally spaced apart in a zigzag arrangement (as shown in FIG. 1A). Having the baffles with a zigzag arrangement may provide a longer residence time of a sulfur-containing stream inside the first and the second vessels, when compared to an embodiment where the baffles are not present. In another embodiment, the baffles are randomly arranged within the vessel. Preferably, each baffle has a planar axis and is secured to the inner wall of each of the first and the second vessel such that the planar axis of each baffle is substantially perpendicular to the longitudinal axis of each of the first vessel and the second vessel. In some embodiments, the baffles are tilted such that an angle between the planar axis of each baffle and the longitudinal axis of each vessel is in the range of 70 to 110°, preferably 80 to 100°, preferably 85 to 95°. Preferably, the angle between the planar axis of each baffle and the longitudinal axis of each vessel is no less than 60° and no more than 120°.

In one embodiment, the sulfur removal system 100 further includes a hydrocarbon reservoir 124 located upstream of and fluidly connected to the first inlet 108 via a feed line 134 and optionally a first pump 130. Accordingly, the sulfur-containing hydrocarbon stream can be delivered to the first inlet 108 via the feed line 134 and optionally the first pump 130. Alternatively, the sulfur-containing hydrocarbon stream may be delivered to the first inlet 108 from an upstream processing plant e.g. a cracking tower of a refinery. Alternatively, the sulfur-containing hydrocarbon stream may be delivered directly from an offshore or an onshore oil well.

In one embodiment, the feed line 134 is a tubular channel that is configured to deliver the sulfur-containing hydrocarbon stream 134s to the first inlet 108 of the first vessel 104. Preferably, the feed line is made of a metal or a metal alloy with an anti-corrosive plastic liner or a ceramic liner (e.g. alumina). In one embodiment, a diameter of the feed line is in the range of 1-100 mm, preferably 5-80 mm, preferably 10-70 mm, preferably 15-60 mm, more preferably 20-50 mm, relative to the diameter of the first inlet, which is in the range of 1-100 mm, preferably 5-80 mm, preferably 10-70 mm, preferably 15-60 mm, more preferably 20-50 mm.

In another embodiment, the sulfur removal system 100 further includes a product tank 128 located downstream of and fluidly connected to the second outlet 122 via a product line 140. Preferably, the specification of the product line 140 is substantially the same as that of the feed line 134.

In one embodiment, the sulfur removal system 100 further includes a liquid reservoir 126 located upstream of and fluidly connected to the first inlet 108 via a solvent line 136 and optionally a second pump 132. Accordingly, a solvent can be delivered to the first inlet 108 via the solvent line 136 and optionally the second pump 132. In one embodiment, the liquid reservoir 126 is coated with an anti-corrosive liner to prevent surface oxidation in the liquid reservoir. For example, in one embodiment, the liquid reservoir is made of quartz, a metal, or a metal alloy such as stainless steel, nickel steel, chromium steel, aluminum, aluminum alloy, copper and copper alloys, titanium, and the like. Accordingly, an inner surface of the first vessel is preferably coated with a polymeric liner (e.g. an epoxy liner), quartz, or Pyrex® to prevent corrosion. The liquid reservoir 126 is configured to contain a solvent and deliver the solvent to the first and the second internal cavities to regenerate the first and the second adsorbents.

The solvent line 136 is a tubular channel configured to fluidly connect the liquid reservoir 126 to the first inlet 108. Preferably, the solvent line 136 is made of a metal or a metal alloy with an anti-corrosive plastic liner or a ceramic liner (e.g. alumina). In one embodiment, a diameter of the solvent line is in the range of 1-100 mm, preferably 5-80 mm, preferably 10-70 mm, preferably 15-60 mm, more preferably 20-50 mm, relative to the diameter of the first inlet 108, which is in the range of 1-100 mm, preferably 5-80 mm, preferably 10-70 mm, preferably 15-60 mm, more preferably 20-50 mm.

In one embodiment, the solvent is at least one organic solvent selected from the group consisting of methanol, toluene, tetrahydrofuran, acetic acid, acetone, acetonitrile, butanol, dichloromethane, chloroform, chlorobenzene, dichloroethane, diethylene glycol, diethyl ether, dimethoxyethane, dim ethyl-formamide, dimethyl sulfoxide, ethanol, ethyl acetate, ethylene glycol, heptane, hexamethylphosphoramide, hexamethylphosphorous triamide, methanol, methyl t-butyl ether, methylene chloride, pentane, cyclopentane, hexane, cyclohexane, benzene, dioxane, propanol, isopropyl alcohol, pyridine, triethyl amine, propandiol-1,2-carbonate, ethylene carbonate, propylene carbonate, nitrobenzene, formamide, γ-butyrolactone, benzyl alcohol, n-methyl-2-pyrrolidone, acetophenone, benzonitrile, valeronitrile, 3-methoxy propionitrile, dimethyl sulfate, aniline, n-methylformamide, phenol, 1,2-dichlorobenzene, tri-n-butyl phosphate, ethylene sulfate, benzenethiol, dimethyl acetamide, N,N-dimethylethaneamide, 3-methoxypropionnitrile, diglyme, cyclohexanol, bromobenzene, cyclohexanone, anisole, diethylformamide, 1-hexanethiol, ethyl chloroacetate, 1-dodecanthiol, di-n-butylether, dibutyl ether, acetic anhydride, m-xylene, o-xylene, p-xylene, morpholine, diisopropyl etheramine, diethyl carbonate, 1-pentandiol, n-butyl acetate, and 1-hexadecanthiol. The solvent may have a boiling point of at least 60° C., preferably at least 70° C., more preferably at least 80° C. Preferably, the solvent is capable of dissolving sulfur compounds, without negatively affecting (e.g. poisoning) the first and the second adsorbents. Preferably, the solvent comprises methanol and/or toluene.

Figure 1C:
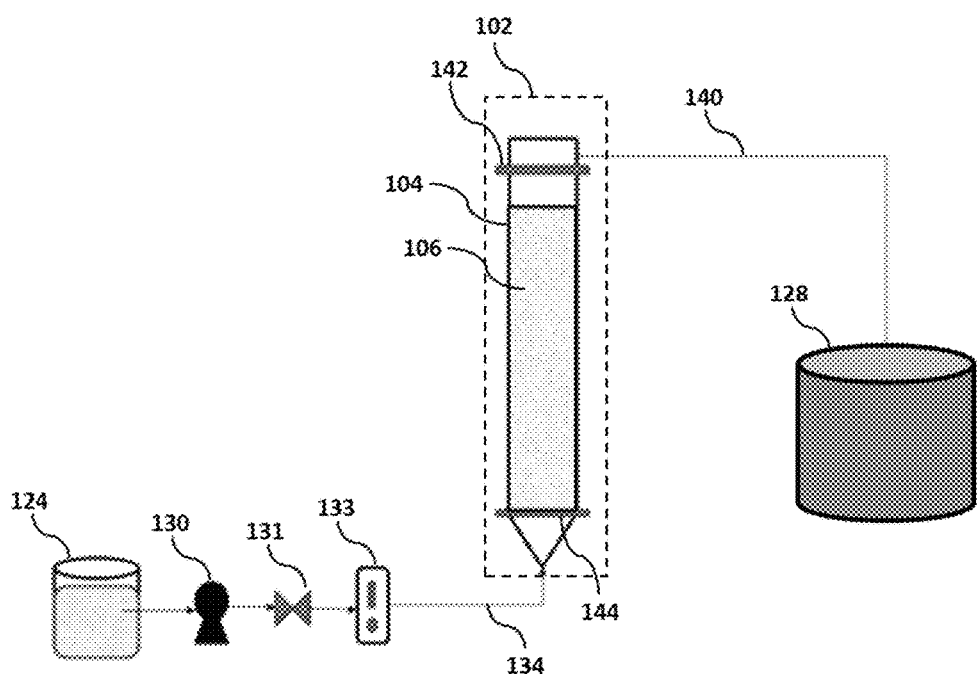
FIG. 1C is a schematic of a sulfur removal system with a fluidized-bed reactor.

Referring now to FIG. 1C, in one embodiment, the sulfur removal system only includes a fluidized-bed reactor 102, which is connected to the hydrocarbon reservoir 124 via the feed line 134, the first pump 130, a first valve 131, and a flow meter 133. A desulfurized hydrocarbon stream, which egresses the fluidized-bed reactor 102 may further be delivered to the product tank 128 via the product line 140.

Figure 1D:
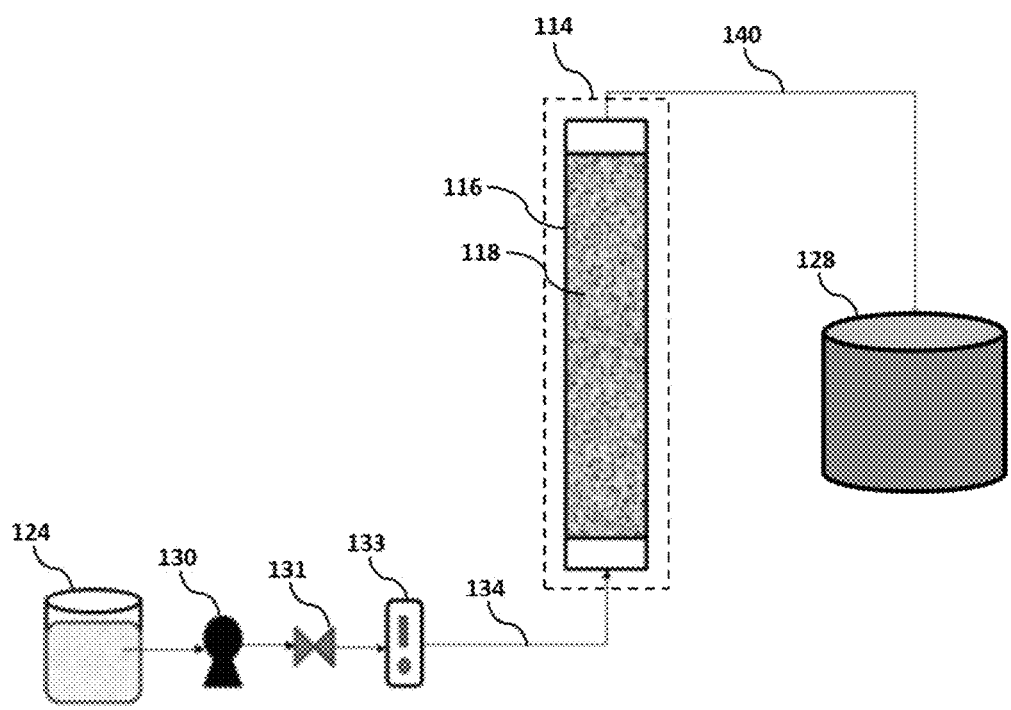
FIG. 1D is a schematic of a sulfur removal system with a fixed-bed reactor.
Figure 1E:
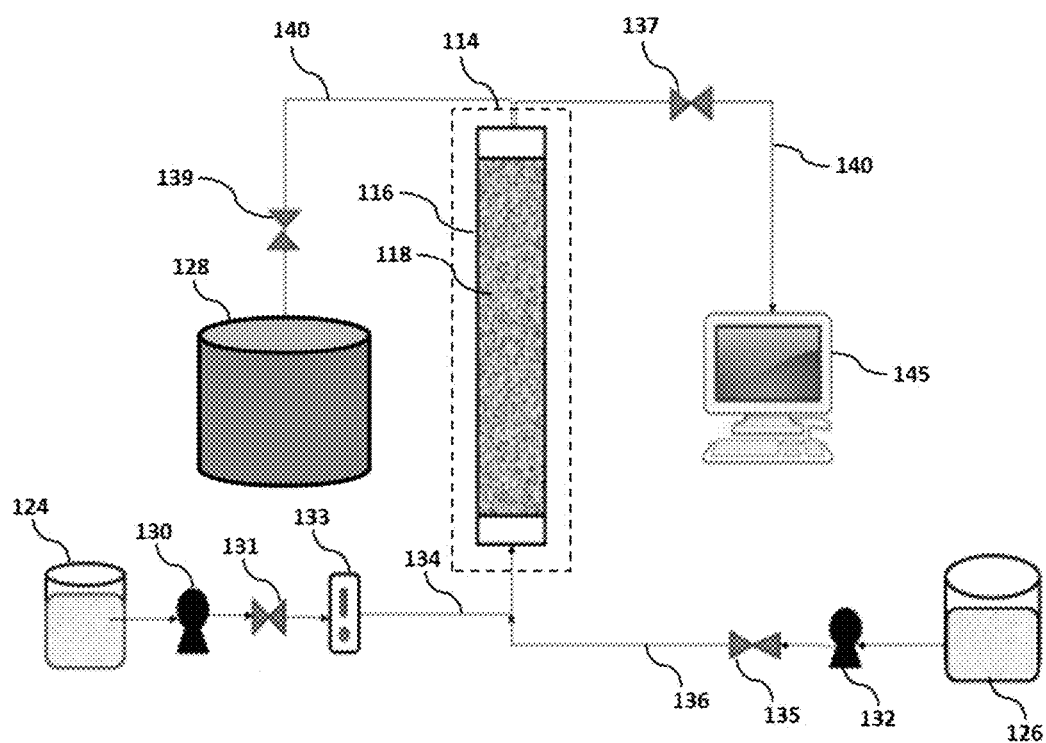
FIG. 1E is a schematic of a sulfur removal system with a fixed-bed reactor, and a liquid reservoir for regenerating an adsorbent present in the fixed-bed reactor.
Figure 1F:
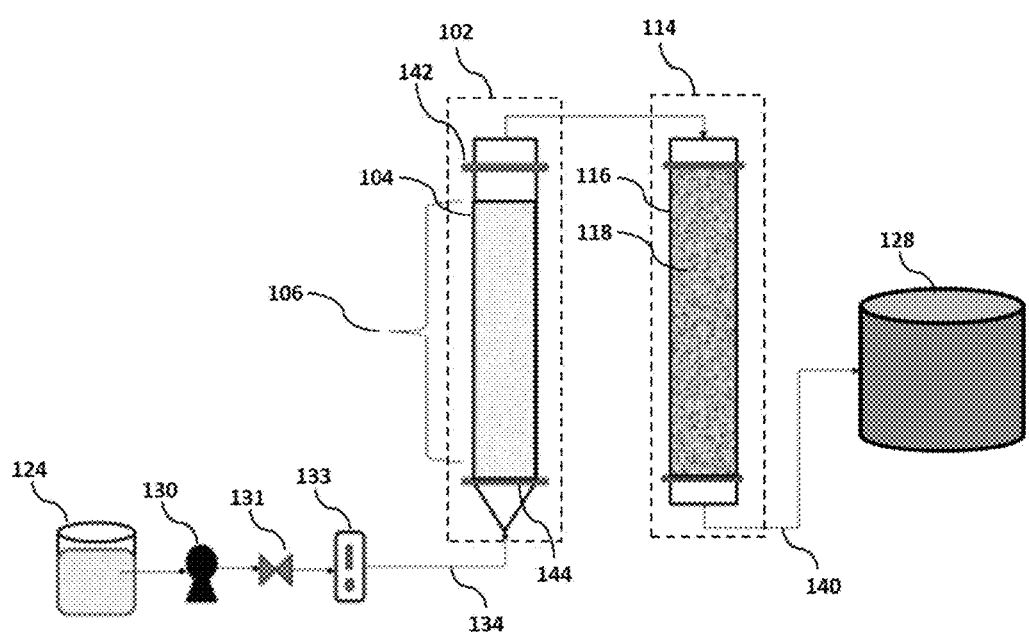
FIG. 1F is a schematic of a sulfur removal system with a fluidized-bed reactor and a fixed-bed reactor located in series to one another.

Referring now to FIG. 1D, in one embodiment, the sulfur removal system only includes a fixed-bed reactor 114, which is connected to a hydrocarbon reservoir 124 via a feed line 134, a first pump 130, a first valve 131, and a flow meter 133. An effluent desulfurized stream, which egresses the fixed-bed reactor 102 is delivered to a product tank 128 via a product line 140, and a third valve 139. In another embodiment, a liquid reservoir 126 is located upstream of and fluidly connected to the fixed-bed reactor 114 via a solvent line 136, a second pump 132, and a second valve 135 (as depicted in FIG. 1E). Accordingly, the first valve 131 is closed and the second valve 135 is opened allowing a solvent to pass through the reactor to regenerate the adsorbent present in the reactor 114 by removing sulfur compounds from the surface of the adsorbent present in the reactor. A contaminated solvent, which egresses the reactor, may be collected in a container located downstream of the reactor. In one embodiment, a sample of the solvent is delivered to a chemical composition analyzer 145 (e.g. a gas chromatograph equipped with a sulfur chemiluminescence detector) via the product line 140 and a fourth valve 137. Sampling the solvent is preferred, because a termination of adsorbent regeneration may be determined via instantaneous detection of the contaminated solvent. In view of that, once a concentration of sulfur compounds drops below a predetermined value (e.g. less than 5 ppm, preferably less than 1 ppm), the second valve 135 is closed and the first valve 131 is opened, allowing a sulfur-containing stream to flow through the reactor 114.

Referring now to FIG. 1F, in one embodiment, the sulfur removal system includes a fluidized-bed reactor 102 and a fixed-bed reactor 114 located in series, wherein an inlet of the fixed-bed reactor (i.e. the second inlet) is located proximal to the top of the fixed-bed reactor 114.

Figure 1G:
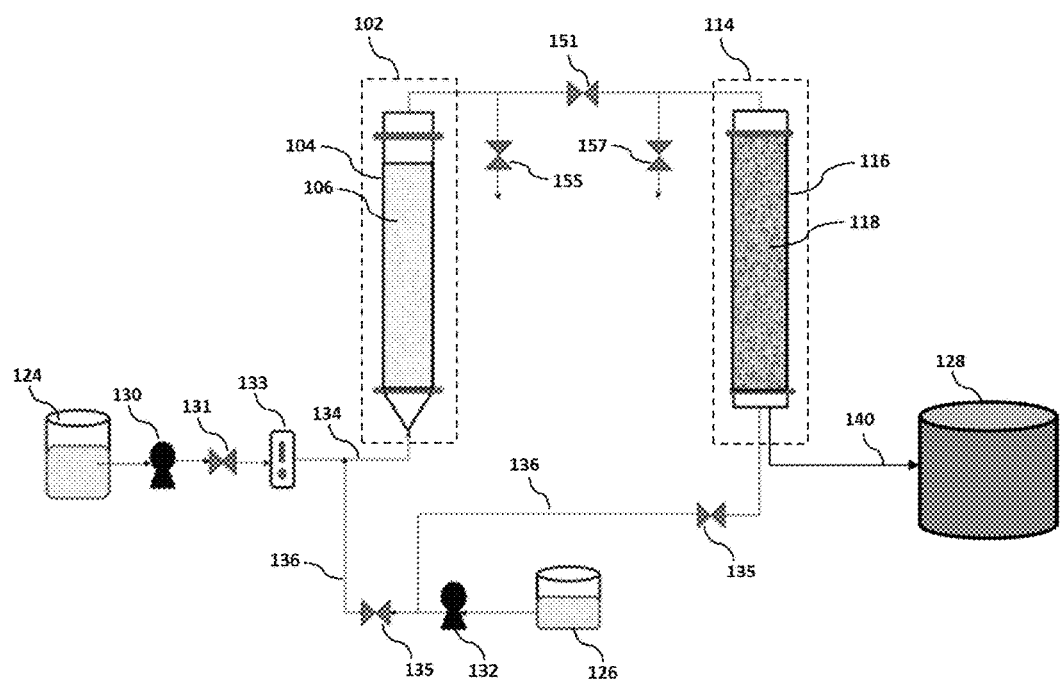
FIG. 1G is a schematic of a sulfur removal system with a fluidized-bed reactor and a fixed-bed reactor located in series to one another, and a liquid reservoir for regenerating a first and a second adsorbent present in the fluidized-bed reactor and the fixed-bed reactor.

Referring now to FIG. 1G, in one embodiment, the sulfur removal system includes a fluidized-bed reactor 102 and a fixed-bed reactor 114 located in series. A liquid reservoir 126 is located upstream of and fluidly connected to the fluidized-bed reactor 102 and the fixed-bed reactor 114 via separate solvent lines 136, a second pump 132, and separate second valves 135 (as depicted in FIG. 1G). Accordingly, the first valve 131 is closed and the second valves 135 are opened allowing a solvent to pass through both the fluidized-bed reactor 102 and the fixed-bed reactor 114 to regenerate the first and the second adsorbent present in both reactors. In view of that, in one embodiment, a fifth 151, a sixth 155, and a seventh valve 157 are located on the connecting line (as depicted in FIG. 1G). Preferably, the fifth valve 151 is closed, while both the sixth valve 155 and the seventh valves 157 are opened, allowing the first and the second adsorbents present in the fluidized-bed reactor 102 and the fixed-bed reactor 114 to be individually treated/regenerated.

Both the first and the second adsorbents include cobalt and copper on an activated carbon support to absorb at least a portion of sulfur compounds present in the sulfur-containing hydrocarbon stream and the partially desulfurized hydrocarbon stream that are passed through the first and the second adsorbents. Exemplary of such sulfur compounds include, but are not limited to mercaptans, sulfides, disulfides, polysulfides, thiols, thioethers, thioesters, thioacetals, sulfoxides, sulfones, thiosulfonates, sulfimides, sulfoximides, sulfonediimines, s-nitrosothiols, sulfur halides, thioketones, thioaldehydes, thiocarbonyls, sulfur oxides, thiocarboxylic acids, thioamides, sulfonic acid, sulfinic acid, sulfenic acids, sulfonium, oxosulfonium, sulfuranes, and persulfuranes.

Preferably, the first and the second adsorbents adsorb sulfur compounds present in the sulfur-containing hydrocarbon stream and the partially desulfurized hydrocarbon stream, and may not involve a hydro-desulfurization reaction whereby sulfur is removed from an organic sulfur compound via a catalytic chemical reaction in the presence of hydrogen. Accordingly, the term "desulfurization" as used in this disclosure refers to a process of removing sulfur compounds from a stream (e.g. a sulfur-containing hydrocarbon stream) via an adsorptive process, and does not refer to a removal of sulfur from an organic sulfur compound via a catalytic chemical reaction. Furthermore, the term "desulfurized hydrocarbon stream" as used in this disclosure refers to a stream that is substantially free from sulfur compounds that are removed via an adsorptive desulfurization process.

In a preferred embodiment, an average particle size of the first and the second adsorbents are substantially the same, wherein each is in the range of 0.5 to 10 mm, preferably 0.75 to 9 mm, preferably 0.8 to 8 mm, preferably 0.85 to 7 mm, preferably 0.9 to 6 mm, preferably 0.95 to 5 mm, preferably 1 to 4 mm, preferably 1.5 to 3 mm, preferably 1.75 to 2 mm.

In a preferred embodiment, a composition of the first and the second adsorbents are substantially the same, wherein each includes cobalt with a weight percent in the range of 1 to 3 wt %, preferably 1.5 to 2.5 wt %, preferably about 2 wt %, and copper with a weight percent in the range of 1 to 5 wt %, preferably 2 to 4 wt %, preferably about 3 wt %, with each weight percentile being relative to the total weight of each of the adsorbents. In an alternative embodiment, the first and the second adsorbents are different. Accordingly the difference between the first and the second adsorbents relates to a weight percent of cobalt and copper. For example, in one embodiment, a weight percent of cobalt in the first adsorbent is in the range of 1 to 3 wt %, preferably 1.5 to 2.5 wt %, preferably about 2 wt %, and a weight percent of copper in the first adsorbent is in the range of 1 to 5 wt %, preferably 2 to 4 wt %, preferably about 3 wt %, whereas a weight percent of cobalt in the second adsorbent is in the range of 1 to 5 wt %, preferably 3 to 4 wt %, preferably about 3.5 wt %, and a weight percent of copper in the first adsorbent is in the range of 1 to 5 wt %, preferably 3 to 4 wt %, preferably about 3.5 wt %, relative to the total weight of each of the adsorbents.

In one embodiment, the first and the second adsorbents further include one or more metals selected from nickel, copper, zinc, cobalt, and molybdenum and/or their oxides and mixtures thereof.

The activated carbon support of each of the adsorbents may be present in the form of a granular activated carbon or a powdered activated carbon. The granular activated carbon may have attributes, such as a pore volume of 0.5-1.0 $cm^3/g$, preferably 0.6-0.95 $cm^3/g$, more preferably 0.7-0.9 $cm^3/g$, even more preferably 0.8-0.85 $cm^3/g$; a specific surface area of 700 to 1500 $m^2/g$, preferably 1000 to 1450 $m^2/g$, more preferably 1200 to 1400 $m^2/g$; and micro-pores (i.e. pores with an average pore diameter of 12-30 Å, preferably 13-20 Å, more preferably 14-15 Å), meso-pores (i.e. pores with an average pore diameter of 15-50 Å, preferably 20-45 Å, more preferably 25-40 Å), and/or macro-pores (i.e. pores with an average pore diameter of at least 50 Å, preferably at least 60 Å).

In one embodiment, the granular activated carbon is recyclable. In another embodiment, the granular activated carbon does not undergo particle coagulation therefore a chance of clogging is low. The granular activated carbon may also remove phenolic compounds and mercury-containing compounds present in a sulfur-containing stream that delivers to the first and the second vessels. Further, the granular activated carbon may also remove or reduce chlorine and/or parasites content of the sulfur-containing stream. The powdered activated carbon may have attributes, such as a pore volume of 0.1-0.5 $cm^3/g$, preferably 0.2-0.45 $cm^3/g$, more preferably 0.3-0.4 $cm^3/g$; a specific surface area of 700 to 1500 $m^2/g$, preferably 1000 to 1450 $m^2/g$, more preferably 1200 to 1400 $m^2/g$; and micro-pores (i.e. pores with an average pore diameter of 12-30 Å, preferably 13-20 Å, more preferably 14-15 Å), meso-pores (i.e. pores with an average pore diameter of 15-50 Å, preferably 20-45 Å, more preferably 25-40 Å), and/or macro-pores (i.e. pores with an average pore diameter of at least 50 Å, preferably at least 60 Å). The powdered activated carbon is preferred over granular activated carbon as the powdered activated carbon has a higher adsorption rate.

In one embodiment, the activated carbon support has a variety of capabilities to be appropriate for different purposes of sulfur adsorption. For example, the activated carbon layer may have an iodine number of 900 to 2000 mg/g, preferably 1500 to 2000 mg/g; a pore volume of 0.3 to 0.8 cm$^3$/g, preferably 0.4 to 0.7 cm$^3$/g; a specific surface area (BET) of 1000 to 2000 m$^2$/g, preferably 1500 to 1900 m$^2$/g; a micro-pore size of 12 to 20 Å, preferably 14 to 18 Å, and a meso-pore size of 30 to 40 Å, preferably 32 to 38 Å. The term "iodine number" of an activated carbon is a representative index of the specific surface area of the activated carbon.

In a preferred embodiment, the activated carbon support of the first adsorbent is substantially the same as that of the second adsorbent, each having an iodine number of 900 to 2000 mg/g, preferably 1500 to 2000 mg/g; a pore volume of 0.3 to 0.8 cm$^3$/g, preferably 0.4 to 0.7 cm$^3$/g; a specific surface area (BET) of 1000 to 2000 m$^2$/g, preferably 1500 to 1900 m$^2$/g; a micro-pore size of 12 to 20 Å, preferably 14 to 18 Å, and a meso-pore size of 30 to 40 Å, preferably 32 to 38 Å.

In one embodiment, the first and the second adsorbents have irregular shape and geometry, although the first and the second adsorbents may also have a cylindrical, a rectilinear, a star-shaped, a conical, a pyramidal, a rectangular, a cubical, and/or a ring shape structure.

According to a second aspect, the present disclosure relates to a method of desulfurizing a sulfur-containing hydrocarbon stream 134s via the sulfur removal system 100, involving delivering the sulfur-containing hydrocarbon stream 134s to the first inlet 108 via the feed line 134 and contacting the sulfur-containing hydrocarbon stream 134s with the first adsorbent to form a partially desulfurized hydrocarbon stream 138s.

The sulfur-containing hydrocarbon stream 134s may be delivered from a hydrocarbon reservoir 124 (as shown in FIG. 1A) or directly from an offshore or an onshore well, which is located upstream of and fluidly connected to the first inlet 108 via the feed line 134 and the first pump 130.

In one embodiment, the sulfur-containing hydrocarbon stream is contacted with the first adsorbent at a temperature of 15 to 35° C., preferably 20 to 30° C., preferably about 25° C., and a pressure of 0.9 to 1.1 atm, preferably 0.95 to 1.05 atm, preferably about 1 atm. In circumstances where a temperature or a pressure of the sulfur-containing hydrocarbon stream falls outside of the above ranges, the temperature and the pressure of the sulfur-containing hydrocarbon stream is first adjusted to be within the ranges mentioned above, and the delivered to the first inlet 108.

In one embodiment, the sulfur-containing hydrocarbon stream 134s includes at least one sulfur compound selected from the group consisting of mercaptans, sulfides, disulfides, polysulfides, thiols, thioethers, thioesters, thioacetals, sulfoxides, sulfones, thiosulfonates, sulfimides, sulfoximides, sulfonediimines, s-nitrosothiols, sulfur halides, thioketones, thioaldehydes, thiocarbonyls, sulfur oxides, thiocarboxylic acids, thioamides, sulfonic acid, sulfinic acid, sulfenic acids, sulfonium, oxosulfonium, sulfuranes, and persulfuranes. In a preferred embodiment, the sulfur-containing hydrocarbon stream 134s includes at least one sulfur compound selected from the group consisting of a thiophene, a benzothiophene, a dibenzothiophene, a methyl benzothiophene, a methyl dibenzothiophene, a dimethyl dibenzothiophene, and a tetrahydrothiophene. More particularly, in another preferred embodiment, the sulfur-containing hydrocarbon stream includes at least one sulfur compound selected from the group consisting of hydrogen sulfide, thiophene, benzothiophene, dibenzo[b,d]thiophene, 5-methyl-1-benzothiophene, 4-methyl dibenzo[b,d]thiophene, and 4,6-dimethyl-dibenzo[b,d]thiophene. The sulfur-containing hydrocarbon stream may further contain one or more combustible compounds (alkanes, alkenes, alkynes, cycloalkanes, etc.) having a carbon number in the range of $C_1$-$C_{20}$, preferably $C_1$-$C_{12}$, more preferably $C_1$-$C_8$. Preferably, the sulfur-containing hydrocarbon stream contains less than 5.0 vol %, preferably less than 2.0 vol % of nitrogen and water vapor. As previously discussed, sulfur compounds are removed via an adsorptive desulfurization process and not a hydrodesulfurization reaction. Therefore, the sulfur-containing hydrocarbon stream preferably does not contain hydrogen, or in some embodiments, a concentration of hydrogen in the sulfur-containing hydrocarbon stream is no more than 2.0 vol %, preferably no more than 1.5 vol %, preferably no more than 1.0 vol %, preferably no more than 0.5 vol %, relative to the total volume of the sulfur-containing hydrocarbon stream. Further to the above, the sulfur-containing hydrocarbon stream may include traces amount (preferably less than 0.1 vol %) of argon, helium, and nitrogen oxides (i.e. nitric oxide, nitrous oxide, nitrogen dioxide). Preferably, the sulfur-containing hydrocarbon stream includes at least 70 vol %, more preferably at least 80 vol %, most preferably at least 90 vol % of the combustible compounds.

In some embodiments, the sulfur-containing hydrocarbon stream is received from an upstream oil well or an upstream refinery processing unit, and has a temperature in a range of 50 to 400° C., preferably 80 to 350° C., preferably 100 to 300° C., preferably 120 to 250° C., preferably 150 to 200° C., and a pressure in the range of 1 to 10 bars, preferably 1.5 to 5 bars, preferably 2 to 4 bars. Accordingly, a temperature of the sulfur-containing hydrocarbon stream is preferably adjusted to be within the range of 15 to 35° C., preferably 20 to 30° C., preferably about 25° C., and a pressure of the sulfur-containing hydrocarbon stream is preferably adjusted to be within the range of 0.9 to 1.5 bars, preferably 0.95 to 1.2 bars, preferably about 1 bar, before delivering the sulfur-containing hydrocarbon stream to the first inlet. In an alternative embodiment, only a pressure of the sulfur-containing hydrocarbon stream is adjusted and the temperature is remained unchanged.

The sulfur-containing hydrocarbon stream is preferably in a liquid phase before delivering to the first inlet, even though the sulfur-containing hydrocarbon stream may be present in a binary liquid/gaseous phase. In view of that, a volume fraction of the liquid phase in the binary liquid/gaseous phase is at least 0.8, preferably at least 0.85, preferably at least 0.9, preferably at least 0.95, preferably at least 0.99.

In one embodiment, a concentration of sulfur compounds in the sulfur-containing hydrocarbon stream is at least 50 ppm, preferably at least 60 ppm, preferably at least 70 ppm, but no more than 1000 ppm. In an alternative embodiment, a concentration of sulfur compounds in the sulfur-containing hydrocarbon stream is in the range of 100 to 10,000 ppm, preferably 500 to 8,000 ppm, preferably 1,000 to 7,000 ppm, preferably 1,500 to 6,000 ppm, preferably 2,000 to 5,000 ppm.

In one embodiment, the sulfur-containing hydrocarbon stream is contacted with the first adsorbent at a space velocity in the range of 50 to 10,000 h$^{-1}$, preferably 100 to 9,000 h$^{-1}$, preferably 500 to 8,000 h$^{-1}$, preferably 800 to 7,000 h$^{-1}$, preferably 1,000 to 6,000 h$^{-1}$, preferably 1,200 to 5,000 h$^{-1}$, preferably 1,500 to 4,000 h$^{-1}$, preferably 2,000 to 3,000 h$^{-1}$. The term "space velocity" as used herein refers to a ratio of the volumetric flow rate of the influent of a reactor (i.e. the sulfur-containing hydrocarbon stream) to a volume of the reactor (i.e. the first vessel). Space velocity indicates how many reactor volumes of a feed can be treated per unit time. For example, a reactor with a space velocity of 5 h$^{-1}$ is capable of processing a feed with a volume that is equivalent to five times the reactor volume in each hour.

In one embodiment, a concentration of sulfur compounds in the partially desulfurized hydrocarbon stream 138s is 10% to 90%, preferably 15% to 80%, preferably 20% to 70%, preferably 25% to 60%, preferably 30% to 55%, preferably 35% to 50%, relative to the concentration of the sulfur compounds in the sulfur-containing hydrocarbon stream. For example, in one embodiment, a concentration of sulfur compounds in the sulfur-containing hydrocarbon stream is in the range of 10 to 1000 ppm, preferably 50 to 800 ppm, preferably 100 to 700 ppm, preferably 150 to 600 ppm, preferably 200 to 500 ppm, wherein a concentration of sulfur compounds in the partially desulfurized hydrocarbon stream is in the range of 2 to 200 ppm, preferably 10 to 160 ppm, preferably 20 to 140 ppm, preferably 30 to 120 ppm, preferably 40 to 100 ppm. Preferably, a concentration of the combustible compounds in the partially desulfurized hydrocarbon stream is substantially the same as the concentration of the combustible compounds in the sulfur-containing hydrocarbon stream. Since sulfur compounds present in the partially desulfurized hydrocarbon stream are further removed via another adsorptive desulfurization process and not a hydro-desulfurization reaction, the partially desulfurized hydrocarbon stream preferably does not contain hydrogen, or in some embodiments, a concentration of hydrogen in the partially desulfurized hydrocarbon stream is no more than 2.0 vol %, preferably no more than 1.5 vol %, preferably no more than 1.0 vol %, preferably no more than 0.5 vol %, relative to the total volume of the partially desulfurized hydrocarbon stream.

Preferably, a temperature and a pressure of the partially desulfurized hydrocarbon stream is substantially the same as that of the sulfur-containing hydrocarbon stream. For example, in some embodiments, the temperature of the partially desulfurized hydrocarbon stream is in the range of 15 to 35° C., preferably 20 to 30° C., preferably about 25° C., and a pressure of the partially desulfurized hydrocarbon stream is in the range of 0.9 to 1.1 atm, preferably 0.95 to 1.05 atm, preferably about 1 atm.

The method of desulfurizing further involves delivering the partially desulfurized hydrocarbon stream 138s to the second inlet 120 via the connecting line 138 and contacting the partially desulfurized hydrocarbon stream 138s with the second adsorbent to form a desulfurized hydrocarbon stream 140s.

In one embodiment, the partially desulfurized hydrocarbon stream is contacted with the second adsorbent at a temperature of 15 to 35° C., preferably 20 to 30° C., preferably about 25° C., and a pressure of 0.9 to 1.1 atm, preferably 0.95 to 1.05 atm, preferably about 1 atm. Furthermore, the partially desulfurized hydrocarbon stream is contacted with the second adsorbent at a space velocity in the range of 50 to 10,000 h$^{-1}$, preferably 100 to 9,000 h$^{-1}$, preferably 500 to 8,000 h$^{-1}$, preferably 800 to 7,000 h$^{-1}$, preferably 1,000 to 6,000 h$^{-1}$, preferably 1,200 to 5,000 h$^{-1}$, preferably 1,500 to 4,000 h$^{-1}$, preferably 2,000 to 3,000 h$^{-1}$.

In one embodiment, a concentration of sulfur compounds in the desulfurized hydrocarbon stream 140s is 0% to 10%, preferably 0.5% to 8%, preferably 0.6% to 7%, preferably 0.7% to 6%, preferably 0.8% to 5%, preferably 0.9% to 4%, preferably 1% to 3%, preferably 1.2% to 2%, relative to the concentration of the sulfur compounds in the sulfur-containing hydrocarbon stream. For example, in one embodiment, a concentration of sulfur compounds in the sulfur-containing hydrocarbon stream is in the range of 10 to 1000 ppm, preferably 50 to 800 ppm, preferably 100 to 700 ppm, preferably 150 to 600 ppm, preferably 200 to 500 ppm, wherein a concentration of sulfur compounds in the desulfurized hydrocarbon stream is in the range of 0 to 100 ppm, preferably 0.5 to 60 ppm, preferably 1 to 50 ppm, preferably 2 to 20 ppm, preferably 4 to 10 ppm. Preferably, a concentration of the combustible compounds in the desulfurized hydrocarbon stream is substantially the same as the concentration of the combustible compounds in the sulfur-containing hydrocarbon stream. Preferably, a temperature and a pressure of the desulfurized hydrocarbon stream is substantially the same as that of the sulfur-containing hydrocarbon stream. For example, in some embodiments, the temperature of the desulfurized hydrocarbon stream is in the range of 15 to 35° C., preferably 20 to 30° C., preferably about 25° C., and a pressure of the desulfurized hydrocarbon stream is in the range of 0.9 to 1.1 atm, preferably 0.95 to 1.05 atm, preferably about 1 atm.

In one embodiment, a concentration of the sulfur compounds in the desulfurized hydrocarbon stream 140s is higher than 10 ppm, preferably higher than 15 ppm, preferably higher than 20 ppm, but no more than 100 ppm. In view of that, the desulfurized hydrocarbon stream is delivered to the first inlet 108 via a recycle line (not shown in figures) to be contacted with the first and the second adsorbents for a second time to reduce the concentration of the sulfur compounds of the desulfurized hydrocarbon stream to a value less than 5 ppm, preferably less than 2 ppm, preferably less than 1 ppm. Preferably, specification of the recycle line is substantially the same as specification of the feed line 134 and the product line 140.

The desulfurized hydrocarbon stream 140s may further be collected in the product tank 128 via the product line 140. Furthermore, the desulfurized hydrocarbon stream 140s may be transferred to a combustion system or another unit in a refinery or a petrochemical plant for further processing.

In a preferred embodiment, the method of desulfurizing further involves delivering the solvent 136s from the liquid reservoir 126 to the first inlet 108 via the solvent line 136 and the second pump 132. Accordingly, a flow of the sulfur-containing hydrocarbon stream to the first vessel is stopped, for example, via a shut valve. Then, the solvent is delivered to the first inlet 108, whereby the solvent 136s is passed through the first adsorbent in the first vessel 104 and the second adsorbent in the second vessel 116 to dissolve sulfur compounds that are deposited on a surface of the first and the second adsorbents. The contaminated solvent, which has dissolved the sulfur compounds, may be collected via the product line 140 in a separate container (not shown). According to this embodiment, the first and the second adsorbents may be regenerated and are ready to be used in the desulfurizing process again. The term "regeneration" refers to a process whereby sulfur compounds present on a surface of an adsorbent are removed, and the adsorbent is prepared to be utilized in a desulfurizing process. In view of this embodiment, the first and the second adsorbents are regenerated within the first and the second reactors, and therefore, the method does not involve replacing the adsorbents to an external adsorbent regeneration system to regenerate the adsorbent. The solvent is preferably passed through the first and the second adsorbents at a temperature in the range of 50 to 120° C., preferably 55 to 110° C., preferably 60 to 100° C., preferably 65 to 85° C., preferably about 70° C., for at least 5 hours, preferably at least 10 hours, but no more than 24 hours.

In one embodiment, the method further involves delivering an inert gas to the first inlet, after delivering the solvent. The inert gas is delivered to evaporate the solvent. Accordingly, the inert gas may preferably be delivered with a temperature in the range of 150 to 350° C., preferably 180 to 300° C., preferably 200 to 280° C., preferably 220 to 260° C., preferably about 250° C., and a flow rate of 0.02 to 5 L/min, preferably 0.05 to 4 L/min, preferably 0.1 to 3 L/min, preferably 0.2 to 2.5 L/min, preferably 0.3 to 2 L/min, preferably 0.5 to 1.5 L/min, preferably 0.8 to 1 L/min. In one embodiment, the inert gas is at least one gas selected from the group consisting of nitrogen, helium, argon, and krypton. Preferably, the inert gas is passed through the first and the second adsorbents with a pressure in the range of 1-10 atm, preferably 1.1 to 8 atm, preferably 1.2 to 7 atm, preferably 1.3 to 6 atm, preferably 1.4 to 5 atm, preferably 1.5 to 4 atm, preferably 1.6 to 3 atm.

In one embodiment, a total cost of the method of desulfurizing as described in the second aspect of this disclosure, is at least 20%, preferably at least 30%, preferably at least 40%, preferably at least 50% lower than other existing desulfurization processes, mainly because regenerating the adsorbents, as described, is at least 20%, preferably at least 30%, preferably at least 40%, preferably at least 50% lower in cost than other existing methods such as thermal regeneration methods (that generally require withdrawal of the adsorbents) and ultra-sonicating regeneration.

According to a third aspect, the present disclosure relates to a method of making an adsorbent, which comprises cobalt and copper on an activated carbon support.

The method involves mixing activated carbon particles with an aqueous solution that includes at least one of ethanol, diethylene glycol, and sodium diacetate to form a first suspension.

The method of making the adsorbent further involves mixing and refluxing a cobalt-containing solution with the first suspension to form cobalt-containing activated carbon particles. Preferably, a weight ratio of the cobalt-containing solution to that of the activated carbon particles is in the range of 0.5:10 to 3:10, preferably 0.75:10 to 2.5:10, preferably 1.5:10 to 2:10, more preferably about 1.5:7.

In one embodiment, the cobalt-containing solution is cobalt acetate (e.g., cobalt acetate tetrahydrate) dissolved in deionized water. In another embodiment, the cobalt-containing solution is a nitrate or phosphate of cobalt, e.g. cobalt nitrate. Alternatively, the cobalt-containing solution may be a cobalt halide solution, with halide being fluoride, chloride, bromide, or iodide. Preferably, the cobalt-containing solution is first dissolved in deionized water, and the resulting solution is then added to the first suspension, and refluxed at a temperature in the range of 70 to 120° C., preferably 75 to 110° C., preferably 80 to 100° C., for at least 6 hours, preferably at least 8 hours, but no more than 12 hours. A pH of the resulting solution may be adjusted to be within the range of 8 to 10, preferably 8.5 to 9.5, preferably about 9. During this time, cobalt particles may precipitate on the activated carbon particles, and thus forming the cobalt-containing activated carbon particles.

The method of making the adsorbent further involves filtering and drying the cobalt-containing activated carbon particles and mixing the same with the aqueous solution to form a second suspension. After filtering the cobalt-containing activated carbon particles, they may be washed until a pH of the cobalt-containing activated carbon particles reduces to a value in the range of 5 to 7, preferably 5.5 to 6.5, preferably about 6. The cobalt-containing activated carbon particles may be dried at a temperature in the range of 120 to 180° C., preferably 130 to 170° C., preferably 140 to 160° C.

The method of making the adsorbent further involves mixing and refluxing a copper-containing solution with the second suspension to form the adsorbent. Preferably, a weight ratio of the copper-containing solution to that of the activated carbon particles is in the range of 0.1:10 to 3:10, preferably 0.2:10 to 2:10, preferably 0.3:10 to 1.75:10, more preferably about 0.5:10.

In one embodiment, the copper-containing solution is copper nitrate dissolved in deionized water. In another embodiment, the copper-containing solution is an acetate or phosphate of copper, e.g. copper acetate. Alternatively, the copper-containing solution may be a copper halide solution, with halide being fluoride, chloride, bromide, or iodide. Preferably, the copper-containing solution is first dissolved in deionized water, and the resulting solution is then added to the second suspension, and refluxed at a temperature in the range of 70 to 120° C., preferably 75 to 110° C., preferably 80 to 100° C., for at least 6 hours, preferably at least 8 hours, but no more than 12 hours. A pH of the resulting solution may be adjusted to be within the range of 8 to 10, preferably 8.5 to 9.5, preferably about 9. During this time, copper particles may precipitate on the cobalt-containing activated carbon particles, and thus forming the adsorbent that includes cobalt and copper on an activated carbon support.

In one embodiment, the method of making the adsorbent further involves preparing activated carbon particles and mixing the activated carbon particles with an aqueous solution. Accordingly, pieces of rubber isothermally heated at a temperature of 250 to 550° C., preferably 300 to 500° C., for at least 3 hours, preferably at least 4 hours, preferably at least 5 hours, but no more than 12 hours, to form a char. The char is further treated with an oxidizing agent to remove organic impurities. The oxidizing agent is preferably hydrogen peroxide, although other oxidizing agents such as a halogen solution, potassium nitrate, and/or nitric acid may also be used. The treated char is further heated isothermally at a temperature of 400 to 900° C., preferably 600 to 900° C., preferably 800 to 900° C., for at least 3 hours, preferably at least 4 hours, preferably at least 5 hours, but no more than 12 hours, to form porous carbon particles. The porous carbon particles may further be washed with deionized water and dried at a temperature in the range of 120 to 180° C., preferably 130 to 170° C., preferably 140 to 160° C. Preferably, the porous carbon particles are further treated with an acid solution to form the activated carbon particles. Accordingly, a weight of the porous carbon particles to a volume of the acid solution is in the range of 5 g:100 ml to 15 g:100 ml, preferably 7 g:100 ml to 13 g:100 ml, preferably 9 g:100 ml to 11 g:100 ml, preferably about 10 g:100 ml. According to this embodiment, the porous carbon particles is refluxed in the acid solution at a temperature in the range of 80 to 110° C., preferably 85 to 105° C., preferably about 90° C., for at least 3 hours, preferably at least 4 hours, preferably at least 5 hours, but no more than 12 hours. The acid solution is preferably an aqueous solution of nitric acid with a concentration of 3 to 5 M, preferably 3.5 to 4.5 M, preferably about 4 M.

The examples below are intended to further illustrate protocols for the sulfur removal system, the method of desulfurizing a sulfur-containing stream, and the method of making the adsorbent, and are not intended to limit the scope of the claims.

Example 1—Adsorbent Preparation

In order to prepare the adsorbent, activated carbon (AC) particles were formed. Accordingly, waste rubber tires were cut into small pieces, and iron wires removed from the rubber pieces. The pieces were cleaned, rinsed with distilled water, and dried at 110° C. for two hours. The granules were then heated to 300° C. to remove all the liquid constituents from the char. Carbonization was performed at around 500° C. in a muffle furnace for five hours, and all adhering organic impurities were oxidized by treating the char with hydrogen peroxide. The char was rinsed thoroughly with distilled water and dried. The carbon black was activated at 900° C. for 5 h, and the resulting activated carbon was rinsed with distilled water and dried. Chemical activation was conducted on the prepared material using 4 M $HNO_3$ (7 g AC/70 ml) at 90° C. for 3 h in a reflux condenser. Finally, the AC was washed thoroughly with distilled water and dried at 110° C. A detailed protocol for converting waste rubber tires (WRTs) to porous carbon is overviewed in the work of Danmaliki et al. and Salah et al. [G. I. Danmaliki, T. A. Saleh, Influence of conversion parameters of waste tires to activated carbon on adsorption of dibenzothiophene from model fuels, Journal of Cleaner Production, 117 (2016) 50-55; T. A. Saleh, G. I. Danmaliki, Influence of acidic and basic treatments of activated carbon derived from waste rubber tires on adsorptive desulfurization of thiophenes, Journal of the Taiwan Institute of Chemical Engineers, 60 (2016) 460-468].

After preparation of activated carbon particles, metals were incorporated as follows. 7 g of the prepared activated carbon was dispersed in a mixture of ethanol and water. Then, 1.5 g of cobalt(II) acetate tetrahydrate, $(CH_3COO)_2Co.4H_2O$ was dissolved in deionized water, and the solution of cobalt(II) acetate tetrahydrate was added dropwise to the activated carbon mixture and stirred. The mixture was refluxed at a temperature in the range of 80 to 100° C. overnight, and the product was further filtered and dried in an oven. The product includes cobalt on activated carbon particles (i.e. Co/AC).

A similar procedure was conducted to with copper nitrate $Cu(NO_3)_2$. Accordingly, 7 g of the prepared activated carbon that also includes cobalt (i.e. Co/AC) was dispersed in a mixture of ethanol and water. Then, 1.03 g of copper nitrate $Cu(NO_3)_2$ was dissolved in deionized water, and the solution of copper nitrate $Cu(NO_3)_2$ was added dropwise to the Co/AC mixture and stirred. The mixture was refluxed at a temperature in the range of 80 to 100° C. overnight, and the product was further filtered and dried in an oven. The product includes cobalt and copper on activated carbon particles.

Example 2—Preparation of Standard Solutions

Six separate standard solutions were prepared by dissolving six sulfuric compounds, including thiophene (T), benzothiophene (BT), dibenzo[b,d]thiophene (DBT), 5-methyl-1-benzothiophene (MBT), 4-methyl dibenzo[b,d]thiophene (MDBT) and 4,6-dimethyldibenzo[b,d]thiophene (DMDBT) into a liquid hydrocarbon to form fuel solutions. A a concentration of the sulfur compounds in the resulting fuel solutions were 50 ppm, 25 ppm, 5 ppm, 1 ppm, and 0.5 ppm.

Example 3—Batch Mode Desulfurization

A batch mode adsorption was conducted. Accordingly, various amounts, in the range between 0.01 to 0.5 g of adsorbents were introduced into 15 ml of the fuel solution. The T, BT, DBT, MBT, MDBT and DMDBT initial concentrations were 50 ppm. The refractory sulfur compounds solutions containing the adsorbents were mixed well under stirring at room temperature until equilibrium. After adsorption period, samples were collected using a syringe filter (hydrophobic polytetrafluoroethylene) and the concentrations of the sulfur compounds were measured by gas chromatography coupled with sulfur chemiluminescence detector (GC-SCD).

Example 4—Continuous Mode Desulfurization

Fixed bed flowing system was used to test the performance of the prepared AC samples. The adsorbent was packed inside the column; model fuel sample was then passed through the column by a peristaltic pump with a controlled flow rate (50 rpm) at a temperature of 25° C., as shown in FIG. 1D. Once the adsorption process was started, treated fuels were sampled at different time intervals and injected to the GC-SCD for analysis. The process was halted after breakthrough was reached.

The system was modified as shown in FIG. 1E for the regeneration of the absorbent materials in fixed bed reactor using solvents. After the adsorption process was completed valves (131) and (137) were closed while valves (135) and (139) were opened. Then, a binary mixture of organic solvents (50/50 vol % methanol/toluene) was injected into the packed column to regenerate the used absorbent material and prepare it for another adsorption process.

Fluidized bed reactor system was used to increase the liquid-solid contact area and to enhance the absorbent performance, as shown in FIG. 1C. The model fuel was pumped to the system at a different flow rate. Then, the flow rate was fixed once the absorbent particles were suspended in the injected fluid and the desired bed expansion was obtained. Finally, the reactor output was sampled and analyzed.

As shown in FIG. 1F, the experimental setup consists of laboratory-scaled fluidized and fixed bed reactor in series, flow meter, two hold-up tanks, valves, peristaltic pump, and GC-SCD analyzer. The fluidized bed column is a two-phase reactor and it is made from quartz tube with (20-30 cm) in length and (1-1.5 cm) inside diameter. To prevent loss of the used material from the lower and upper part of the column, two pieces of standard screen mesh were installed and fixed. While the fixed bed reactor has a length (20-30 cm) and a diameter (1-1.5 cm), the absorbent material was packed in the column, as shown in FIG. 1F.

Example 5—Adsorbent Regeneration

Referring now to FIG. 1G. Initially, valves (131) and (151) were opened and the model fuel was injected into the fluidized bed reactor at a certain volumetric flow using a peristaltic pump. Then, the volumetric flow of the model fuel was increased gradually until the absorbent particles were suspended in the fluid and a required bed expansion was obtained. The output of the fluidized bed reactor was transported into the fixed bed reactor for further adsorption. Finally, the treated fuel, which is the output of the fixed bed reactor, were sampled and injected to a gas chromatography (GC) with a sulfur chemiluminescence detector (SCD) at different time periods. The adsorption process was stopped once the breakthrough was achieved and then the valves (131) and (151) were closed. Then, valves (135), (155), and (157) were opened and a binary mixture of organic solvents (50/50 vol % methanol/toluene) were injected simultaneously to both columns, and a desorption occurred in order to regenerate the particle absorbents for another adsorption process.

Performance of an effective regeneration process for the used absorbent materials in the desulfurization process is very important in economic point. Different techniques have been suggested for the regeneration process including, solvent regeneration, thermal regeneration and ultra-sonication regeneration [Han, Xue, Erin Wishart, and Ying Zheng. A comparison of three methods to regenerate activated carbon saturated by diesel fuels. The Canadian Journal of Chemical Engineering 92, no. 5 (2014), 884-891]. The used absorbent materials in all the different system designs were regenerated subsequently. The used regeneration method was the solvent washing using a binary mixture of organic solvents (50/50 vol % methanol/toluene). This solvent was induced to the system columns at 70 C until there is no sulfur detected by GC-SCD in the used solvent. To guarantee that there are no absorbed solvent molecules in the regenerated absorbent, it has been heated up to 300 C for 1 h and flushed with inert gas $N_2$ simultaneously with a flow rate 40 ml/min [Velu, S., Shingo Watanabe, Xiaoliang Ma, and Chunshan Song, "Regenerable adsorbents for the adsorptive desulfurization of transportation fuels for fuel cell applications.", Chem. Soc., Fuel Chem. Div. Prepr 48 (2003), 526-528]. The solvent washing method has several advantages over other regeneration methods. For example, it is environmentally friendly technique since it does not produce harmful gasses which are the case in the oxidative and reductive regeneration techniques [C. Song, Fuel processing for low-temperature and high-temperature fuel cells: challenges, and opportunities for sustainable development in the 21st century, Catal. Today 77 (2002), 17-49].

Example 6

Figure 2:
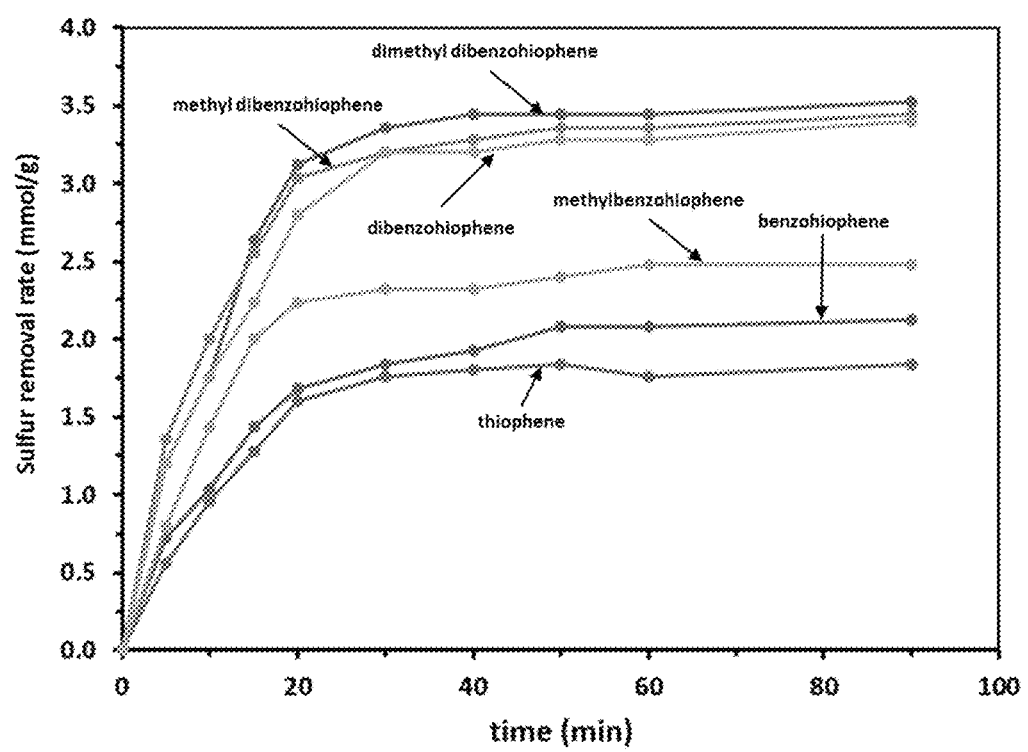
FIG. 2 represents a rate of adsorption of sulfur compounds present in a sulfur-containing stream, when exposed to an adsorbent that includes cobalt and copper on an activated carbon support, at different contact time.

In order to study the effect of the contact time on the adsorption process using AC/CoCu nanoparticles, the removal rate of the sulfur $q_t$ (mmol/g) were plotted against the contact time for the tested sulfur compounds, as shown in FIG. 2. It can be observed that the initial sulfur removal increased rapidly at the first 20 minutes of the batch adsorption process for all the sulfuric compounds. Then, the adsorption rate increased gradually until the equilibrium state was established. A large number of the available active sites can explain the high sulfur removal rate at the initial stage of the adsorption process, which enables the adsorbent to adsorb a large number of the sulfur molecules. The number of the available active sites decreases with time, which leads to reducing the sulfur removal rate. Furthermore, the molecules are adsorbed into the macropores and mesopores at the beginning of the adsorption process, while they have to penetrate deeper toward micro-pores in the next stages of the adsorption process. As a result, the sulfur removal rate was reduced due to the increasing in the resistance to the molecule diffusion.

Example 7

Figure 3:
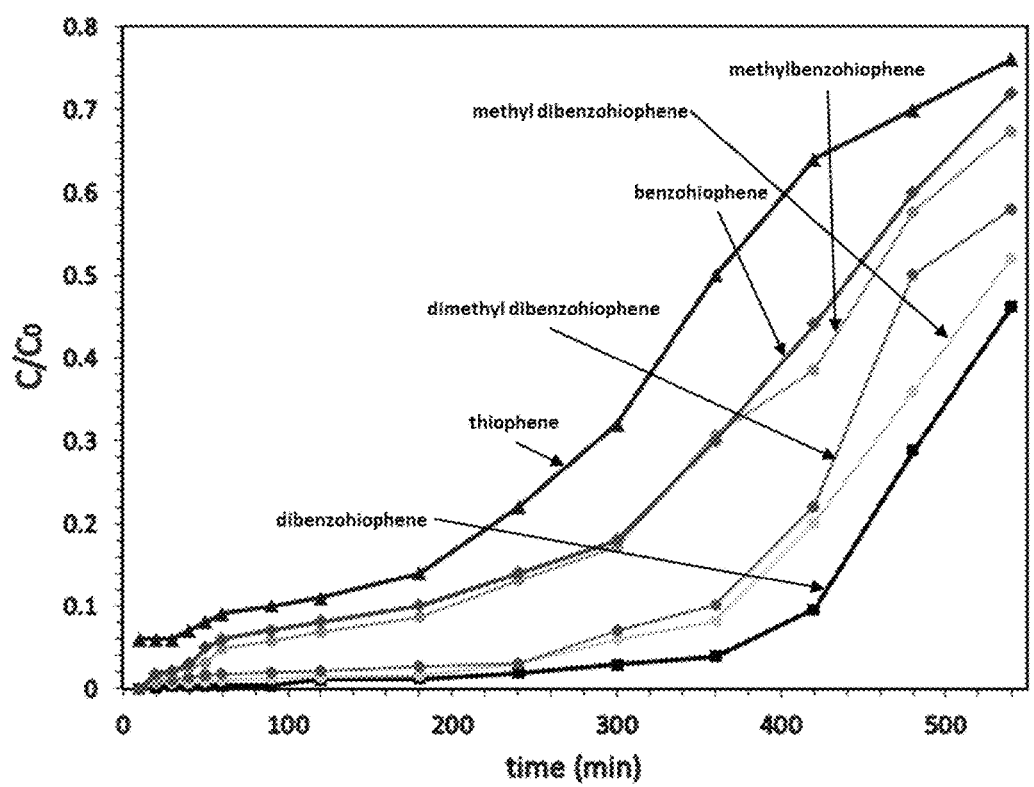
FIG. 3 represents breakthrough curves of compounds present in a sulfur-containing stream, when exposed to an adsorbent that includes cobalt and copper on an activated carbon support.

The adsorptive desulfurization is reiterated to evaluate the adsorption performance of the AC/CoCu adsorbents. As depicted in FIG. 3, the fixed-bed, laboratory-scale reactor comprised a low-flow liquid rotary piston pump, a feed tank, a valve, a custom-made column backed with the material, and a collecting tank. During continuous liquid desulfurization, the fuel containing the six sulfur compounds was allowed to pass through the fixed bed in an up-flow direction. The effluent was sampled periodically, and the evolution of sulfur concentrations was measured by GC-SCD.

The plots of the total thiophene concentrations ($C/C_o$) against cumulative time provided breakthrough curves for each of the adsorbed refractory sulfur compounds in FIG. 3. At the early period of the adsorption, both T and BT were above 0 ppm while others were almost 0 ppm up to about 100 min of adsorption. None of the studied refractory sulfur compounds reached its initial concentration until 540 min. The AC/CoCu worked efficiently for simultaneous adsorptive desulfurization in the order as DBT>MDBT>DMDBT>MBT>BT>Thiophene.

After desulfurization, the saturated adsorbent was subjected to a regeneration treatment by washing with a binary mixture of organic solvents (50/50 vol % methanol/toluene). The evolution of sulfur concentrations in the regeneration effluent was measured by GC-SCD. The washing step was followed by bed heating up to 180° C. under a continuous inert flow of around 1 $L \cdot min^{-1}$ $N_2$ in order to remove the remaining solvent. With this strategy of regeneration, after five cycles performed in total, the efficiency of the regenerated AC/CoCu adsorbent remained relatively stable. The combination of the fluidized system with the fixed system provided almost twice enhancement in the breakthrough comparing with the single fixed bed system.

The invention claimed is:

1. A sulfur removal system with a cylindrical adsorbent vessel, comprising:
    a first reactor comprising
        a first vessel having a first internal cavity with a first adsorbent bed that contains a first adsorbent,
        a first inlet located proximal to a bottom of the first vessel, and
        a first outlet located proximal to a top of the first vessel, wherein the first vessel is in the form of a cylinder mounted vertically along the axis of the cylinder;
    wherein the first reactor is a fluidized-bed reactor; and
    a second reactor comprising
        a second vessel having a second inlet, a second outlet, and a second internal cavity with a second adsorbent bed that contains a second adsorbent,
    wherein the first and the second adsorbents comprise cobalt and copper on an activated carbon support,
    wherein the first adsorbent bed has a cross-sectional area that is substantially the same as a cross-sectional area of the first vessel, and
    wherein the second inlet is fluidly connected to the first outlet via a connecting line.

2. The system of claim 1, further comprising a lower mesh structure located in the first internal cavity and proximal to the bottom of the first vessel and an upper mesh structure located in the first internal cavity and proximal to the top of the first vessel, defining the first adsorbent bed.

3. The system of claim 2, wherein the first adsorbent has a particle size in the range of 0.5 to 10 mm, and wherein the lower and the upper mesh structures have a mesh size of less than 0.5 mm.

4. The system of claim 1, wherein the second reactor is a fixed-bed reactor.

5. The system of claim 4, wherein the second inlet is located proximal to a top of the second vessel and the second outlet is located proximal to a bottom of the second vessel.

6. The system of claim 4, wherein the second inlet is located proximal to a bottom of the second vessel and the second outlet is located proximal to a top of the second vessel.

7. The system of claim 1, further comprising:
    a liquid reservoir located upstream of and fluidly connected to the first inlet via a solvent line, wherein the liquid reservoir is configured to deliver a solvent to the first and the second internal cavities to regenerate the first and the second adsorbents.

\* \* \* \* \*